US008351677B1

(12) United States Patent
Oakes, III et al.

(10) Patent No.: US 8,351,677 B1
(45) Date of Patent: *Jan. 8, 2013

(54) SYSTEMS AND METHODS FOR REMOTE DEPOSIT OF CHECKS

(75) Inventors: Charles Lee Oakes, III, San Antonio, TX (US); Randy Ray Morlen, San Antonio, TX (US); R. Bharat Prasad Nuggehalli, San Antonio, TX (US); Greg Alan Harpel, San Antonio, TX (US); Michael Frank Morris, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 754 days.

This patent is subject to a terminal disclaimer.

(21) Appl. No.: 11/590,963

(22) Filed: Oct. 31, 2006

(51) Int. Cl.
*G06K 9/00* (2006.01)
*G06F 17/00* (2006.01)

(52) U.S. Cl. .................... 382/137; 382/176; 235/379

(58) Field of Classification Search .................. 382/112, 382/113, 115, 116, 135, 137, 138, 139, 140, 382/155, 168, 181, 182, 187, 190–203, 232, 382/260, 274, 276, 287, 294, 295, 305, 320, 382/321; 235/379; 709/219; 705/45, 64, 705/21

See application file for complete search history.

(56) References Cited

U.S. PATENT DOCUMENTS

| | | | |
|---|---|---|---|
| 3,005,282 A | 10/1961 | Christiansen |
| 3,341,820 A | 9/1967 | Grillmeier |
| 3,576,972 A | 5/1971 | Wood |
| 3,593,913 A | 7/1971 | Bremer |
| 3,620,553 A | 11/1971 | Donovan |
| 3,648,242 A | 3/1972 | Grosbard |
| 3,800,124 A | 3/1974 | Walsh |
| 3,816,943 A | 6/1974 | Henry |
| 4,002,356 A | 1/1977 | Weidmann |
| 4,060,711 A | 11/1977 | Buros |
| 4,070,649 A | 1/1978 | Wright, Jr. et al. |
| 4,128,202 A | 12/1978 | Buros |
| 4,136,471 A | 1/1979 | Austin |
| 4,205,780 A | 6/1980 | Burns |
| 4,264,808 A | 4/1981 | Owens et al. |
| 4,305,216 A | 12/1981 | Skelton |
| 4,321,672 A | 3/1982 | Braun |
| 4,433,436 A | 2/1984 | Carnes |

(Continued)

FOREIGN PATENT DOCUMENTS

EP 0984410 3/2000

OTHER PUBLICATIONS

Affinity Federal Credit Union, "Affinity announces online depsoit," Aug. 4, 2005, Affinity Federal Credit Union.
"Check 21—The check is not in the post", RedTitan Technology 2004./http://www.redtitan.com/check21/htm, 3 pgs[7].
Hartly, Thomas, "Banks Check Out New Image", Business First, Buffalo: Jul. 16, 2004, vol. 20, Iss 43, p. 1, 3 pages[7].
Wade, Will, "Early Notes: Updating Consumers on Check 21" American Banker Aug. 10, 2004 (3 pages)[7].

(Continued)

*Primary Examiner* — Seyed Azarian
(74) *Attorney, Agent, or Firm* — Brinks Hofer Gilson & Lione

(57) ABSTRACT

Remote deposit of checks can be facilitated by a financial institution. A customer's general purpose computer and image capture device may be leveraged to capture an image of a check and deliver the image to financial institution electronics. Additional data for the transaction may be collected as necessary. The transaction can be automatically accomplished utilizing the images and data thus acquired.

24 Claims, 6 Drawing Sheets

U.S. PATENT DOCUMENTS

| | | |
|---|---|---|
| 4,454,610 A | 6/1984 | Sziklai |
| RE31,692 E | 10/1984 | Tyburski et al. |
| 4,523,330 A | 6/1985 | Cain |
| 4,636,099 A | 1/1987 | Goldstone |
| 4,640,413 A | 2/1987 | Kaplan |
| 4,644,144 A | 2/1987 | Chandek |
| 4,722,444 A | 2/1988 | Murphy |
| 4,722,544 A | 2/1988 | Weber |
| 4,727,435 A | 2/1988 | Otani |
| 4,774,663 A | 9/1988 | Musmanno |
| 4,790,475 A | 12/1988 | Griffin |
| 4,806,780 A | 2/1989 | Yamamoto |
| 4,890,228 A | 12/1989 | Longfield |
| 4,927,071 A | 5/1990 | Wood |
| 4,934,587 A | 6/1990 | McNabb |
| 4,960,981 A | 10/1990 | Benton et al. |
| 4,975,735 A | 12/1990 | Bright |
| 5,022,683 A | 6/1991 | Barbour |
| 5,053,607 A | 10/1991 | Carlson et al. |
| 5,146,606 A | 9/1992 | Grondalski |
| 5,157,620 A | 10/1992 | Shaar |
| 5,159,548 A | 10/1992 | Caslavka |
| 5,191,525 A | 3/1993 | LeBrun |
| 5,220,501 A | 6/1993 | Lawlor et al. |
| 5,227,863 A | 7/1993 | Bilbrey et al. |
| 5,229,589 A | 7/1993 | Schneider |
| 5,237,159 A | 8/1993 | Stephens |
| 5,257,320 A | 10/1993 | Etherington et al. |
| 5,265,008 A | 11/1993 | Benton et al. |
| 5,321,816 A | 6/1994 | Rogan |
| 5,347,302 A | 9/1994 | Simonoff |
| 5,350,906 A | 9/1994 | Brody |
| 5,373,550 A | 12/1994 | Campbell et al. |
| 5,419,588 A | 5/1995 | Wood |
| 5,422,467 A | 6/1995 | Graef |
| 5,475,403 A | 12/1995 | Havlovick et al. |
| 5,504,538 A | 4/1996 | Tsujihara |
| 5,504,677 A | 4/1996 | Pollin |
| 5,528,387 A | 6/1996 | Kelly et al. |
| 5,583,759 A | 12/1996 | Geer |
| 5,590,196 A | 12/1996 | Moreau |
| 5,594,225 A | 1/1997 | Botvin |
| 5,598,969 A | 2/1997 | Ong |
| 5,602,936 A | 2/1997 | Green |
| 5,610,726 A | 3/1997 | Nonoshita |
| 5,611,028 A | 3/1997 | Shibasaki |
| 5,630,073 A | 5/1997 | Nolan |
| 5,631,984 A | 5/1997 | Graf et al. |
| 5,668,897 A | 9/1997 | Stolfo |
| 5,673,320 A | 9/1997 | Ray |
| 5,677,955 A | 10/1997 | Doggett et al. |
| 5,678,046 A | 10/1997 | Cahill et al. |
| 5,679,938 A | 10/1997 | Templeton et al. |
| 5,680,611 A | 10/1997 | Rail |
| 5,691,524 A | 11/1997 | Josephson |
| 5,699,452 A | 12/1997 | Vaidyanathan |
| 5,734,747 A | 3/1998 | Vaidyanathan |
| 5,737,440 A | 4/1998 | Kunkler |
| 5,748,780 A | 5/1998 | Stolfo |
| 5,751,842 A | 5/1998 | Riach et al. |
| 5,784,503 A | 7/1998 | Bleecker, III et al. |
| 5,830,609 A | 11/1998 | Warner et al. |
| 5,832,463 A | 11/1998 | Funk |
| 5,838,814 A | 11/1998 | Moore |
| 5,863,075 A | 1/1999 | Rich |
| 5,870,456 A | 2/1999 | Rogers |
| 5,870,724 A | 2/1999 | Lawlor et al. |
| 5,870,725 A | 2/1999 | Bellinger et al. |
| 5,878,337 A | 3/1999 | Joao |
| 5,893,101 A | 4/1999 | Balogh et al. |
| 5,897,625 A | 4/1999 | Gustin et al. |
| 5,901,253 A | 5/1999 | Tretter |
| 5,903,878 A | 5/1999 | Talati |
| 5,903,881 A | 5/1999 | Schrader |
| 4,837,693 A | 6/1999 | Schotz |
| 5,910,988 A | 6/1999 | Ballard ........................ 705/75 |
| 5,917,931 A | 6/1999 | Kunkler |
| 5,924,737 A | 7/1999 | Schrupp |
| 5,926,548 A | 7/1999 | Okamoto |
| 5,930,778 A | 7/1999 | Geer |
| 5,937,396 A | 8/1999 | Konya |
| 5,940,844 A | 8/1999 | Cahill |
| 5,982,918 A | 11/1999 | Mennie |
| 5,987,439 A | 11/1999 | Gustin |
| 6,012,048 A | 1/2000 | Gustin |
| 6,014,454 A | 1/2000 | Kunkler |
| 6,021,202 A | 2/2000 | Anderson |
| 6,021,397 A | 2/2000 | Jones |
| 6,029,887 A | 2/2000 | Furuhashi |
| 6,030,000 A | 2/2000 | Diamond |
| 6,032,137 A | 2/2000 | Ballard ........................ 705/75 |
| 6,038,553 A | 3/2000 | Hyde |
| 6,053,405 A | 4/2000 | Irwin, Jr. et al. |
| 6,073,119 A | 6/2000 | Bornemisza-Wahr |
| 6,085,168 A | 7/2000 | Mori |
| 6,097,834 A | 8/2000 | Krouse |
| 6,097,885 A | 8/2000 | Rayner |
| 6,105,865 A | 8/2000 | Hardesty |
| 6,145,738 A | 11/2000 | Stinson |
| 6,151,426 A | 11/2000 | Lee |
| 6,159,585 A | 12/2000 | Rittenhouse |
| 6,170,744 B1 | 1/2001 | Lee |
| 6,188,506 B1 | 2/2001 | Kaiserman |
| 6,189,785 B1 | 2/2001 | Lowery |
| 6,192,165 B1 | 2/2001 | Irons |
| 6,195,694 B1 | 2/2001 | Chen et al. |
| 6,199,055 B1 | 3/2001 | Kara |
| 6,236,009 B1 | 5/2001 | Emigh et al. |
| 6,243,689 B1 | 6/2001 | Norton |
| 6,278,983 B1 | 8/2001 | Ball |
| 6,282,826 B1 | 9/2001 | Richards |
| 6,293,469 B1 | 9/2001 | Masson et al. |
| 6,304,860 B1 | 10/2001 | Martin, Jr. |
| 6,314,452 B1 | 11/2001 | Dekel |
| 6,317,727 B1 | 11/2001 | May |
| 6,328,207 B1 | 12/2001 | Gregoire et al. |
| 6,330,546 B1 | 12/2001 | Gopinathan et al. |
| 6,339,658 B1 | 1/2002 | Moccagatta |
| 6,363,164 B1 | 3/2002 | Jones |
| 6,390,362 B1 | 5/2002 | Martin |
| 6,397,196 B1 | 5/2002 | Kravetz |
| 6,408,084 B1 | 6/2002 | Foley |
| 6,411,725 B1 | 6/2002 | Rhoads |
| 6,411,737 B2 | 6/2002 | Wesolkowski et al. |
| 6,411,938 B1 | 6/2002 | Gates et al. |
| 6,413,305 B1 | 7/2002 | Mehta |
| 6,417,869 B1 | 7/2002 | Do |
| 6,425,017 B1 | 7/2002 | Dievendorff |
| 6,429,952 B1 | 8/2002 | Olbricht |
| 6,439,454 B1 | 8/2002 | Masson et al. |
| 6,449,397 B1 | 9/2002 | Che-Chu |
| 6,450,403 B1 | 9/2002 | Martens et al. ................ 235/379 |
| 6,464,134 B1 * | 10/2002 | Page ........................... 235/379 |
| 6,470,325 B1 | 10/2002 | Leemhuis |
| 6,505,178 B1 | 1/2003 | Flenley |
| 6,546,119 B2 | 4/2003 | Ciolli et al. |
| 6,574,609 B1 | 6/2003 | Downs |
| 6,578,760 B1 | 6/2003 | Otto |
| 6,587,837 B1 | 7/2003 | Spagna |
| 6,606,117 B1 | 8/2003 | Windle |
| 6,609,200 B2 | 8/2003 | Anderson |
| 6,611,598 B1 | 8/2003 | Hayosh |
| 6,614,930 B1 | 9/2003 | Agnihotri et al. |
| 6,643,416 B1 | 11/2003 | Daniels |
| 6,654,487 B1 | 11/2003 | Downs, Jr. |
| 6,661,910 B2 | 12/2003 | Jones |
| 6,672,452 B1 | 1/2004 | Alves |
| 6,682,452 B2 | 1/2004 | Quintus |
| 6,695,204 B1 | 2/2004 | Stinson |
| 6,711,474 B1 | 3/2004 | Treyz et al. |
| 6,726,097 B2 | 4/2004 | Graef |
| 6,728,397 B2 | 4/2004 | McNeal |
| 6,738,496 B1 | 5/2004 | Van Hall |
| 6,742,128 B1 | 5/2004 | Joiner |
| 6,745,186 B1 | 6/2004 | Testa et al. |
| 6,754,640 B2 | 6/2004 | Bozeman |
| 6,755,340 B1 | 6/2004 | Voss |

| Patent | Date | Name |
|---|---|---|
| 6,763,226 B1 | 7/2004 | McZeal |
| 6,781,962 B1 | 8/2004 | Williams |
| 6,786,398 B1 | 9/2004 | Stinson |
| 6,789,054 B1 | 9/2004 | Makhlouf |
| 6,796,491 B2 | 9/2004 | Nakajima |
| 6,806,903 B1 | 10/2004 | Okisu et al. |
| 6,813,733 B1 | 11/2004 | Li |
| 6,829,704 B2 | 12/2004 | Zhang |
| 6,844,885 B2 | 1/2005 | Anderson et al. |
| 6,856,965 B1 * | 2/2005 | Stinson et al. .................. 705/21 |
| 6,863,214 B2 | 3/2005 | Garner et al. |
| 6,870,947 B2 | 3/2005 | Kelland |
| 6,883,140 B1 | 4/2005 | Acker et al. |
| 6,898,314 B2 | 5/2005 | Kung et al. |
| 6,902,105 B2 | 6/2005 | Koakutsu |
| 6,913,188 B2 | 7/2005 | Wong |
| 6,931,591 B1 | 8/2005 | Brown |
| 6,934,719 B2 | 8/2005 | Nally |
| 6,957,770 B1 | 10/2005 | Robinson |
| 6,961,689 B1 | 11/2005 | Greenberg |
| 6,970,843 B1 | 11/2005 | Forte |
| 6,973,589 B2 | 12/2005 | Wright |
| 6,983,886 B2 | 1/2006 | Natsukari et al. |
| 6,993,507 B2 | 1/2006 | Meyer |
| 6,996,263 B2 | 2/2006 | Jones |
| 6,999,943 B1 | 2/2006 | Johnson et al. |
| 7,003,040 B2 | 2/2006 | Yi |
| 7,004,382 B2 | 2/2006 | Sandru |
| 7,010,155 B2 | 3/2006 | Koakutsu et al. |
| 7,010,507 B1 | 3/2006 | Anderson et al. |
| 7,016,704 B2 | 3/2006 | Pallakoff |
| 7,039,048 B1 | 5/2006 | Monta |
| 7,058,036 B1 | 6/2006 | Yu |
| 7,062,099 B2 | 6/2006 | Li et al. |
| 7,062,456 B1 | 6/2006 | Riehl et al. |
| 7,062,768 B2 | 6/2006 | Kubo |
| 7,072,862 B1 | 7/2006 | Wilson |
| 7,076,458 B2 | 7/2006 | Lawlor et al. |
| 7,086,003 B2 | 8/2006 | Demsky |
| 7,092,561 B2 | 8/2006 | Downs, Jr. |
| 7,104,443 B1 | 9/2006 | Paul et al. |
| 7,113,925 B2 | 9/2006 | Waserstein |
| 7,114,649 B2 | 10/2006 | Nelson |
| 7,139,594 B2 | 11/2006 | Nagatomo |
| 7,140,539 B1 | 11/2006 | Crews |
| 7,163,347 B2 | 1/2007 | Lugg |
| 7,178,721 B2 | 2/2007 | Maloney |
| 7,181,430 B1 | 2/2007 | Buchanan et al. |
| 7,184,980 B2 | 2/2007 | Allen-Rouman et al. |
| 7,197,173 B2 | 3/2007 | Jones |
| 7,200,255 B2 | 4/2007 | Jones |
| 7,204,412 B2 | 4/2007 | Foss, Jr. |
| 7,216,106 B1 | 5/2007 | Buchanan |
| 7,219,082 B2 | 5/2007 | Forte |
| 7,219,831 B2 | 5/2007 | Murata |
| 7,249,076 B1 | 7/2007 | Pendleton |
| 7,252,224 B2 | 8/2007 | Verma |
| 7,257,246 B1 | 8/2007 | Brodie et al. |
| 7,266,230 B2 | 9/2007 | Doran |
| 7,290,034 B2 | 10/2007 | Budd |
| 7,299,970 B1 | 11/2007 | Ching |
| 7,299,979 B2 | 11/2007 | Phillips |
| 7,313,543 B1 | 12/2007 | Crane |
| 7,314,163 B1 | 1/2008 | Crews et al. |
| 7,321,874 B2 | 1/2008 | Dilip |
| 7,321,875 B2 | 1/2008 | Dilip |
| 7,325,725 B2 | 2/2008 | Foss |
| 7,328,190 B2 | 2/2008 | Smith et al. |
| 7,330,604 B2 | 2/2008 | Wu et al. |
| 7,336,813 B2 | 2/2008 | Prakash et al. |
| 7,343,320 B1 | 3/2008 | Treyz |
| 7,349,566 B2 | 3/2008 | Jones |
| 7,356,505 B2 | 4/2008 | March |
| 7,377,425 B1 | 5/2008 | Ma |
| 7,379,978 B2 * | 5/2008 | Anderson et al. ............. 709/219 |
| 7,385,631 B2 | 6/2008 | Maeno |
| 7,386,511 B2 | 6/2008 | Buchanan |
| 7,391,897 B2 | 6/2008 | Jones |
| 7,391,934 B2 | 6/2008 | Goodall |
| 7,392,935 B2 * | 7/2008 | Byrne et al. .................. 235/379 |
| 7,401,048 B2 | 7/2008 | Rosedale |
| 7,403,917 B1 | 7/2008 | Larsen |
| 7,406,198 B2 | 7/2008 | Aoki et al. |
| 7,421,107 B2 * | 9/2008 | Lugg ............................ 382/139 |
| 7,421,410 B1 | 9/2008 | Schechtman et al. |
| 7,433,098 B2 | 10/2008 | Klein et al. |
| 7,437,327 B2 | 10/2008 | Lam |
| 7,440,924 B2 * | 10/2008 | Buchanan et al. ............. 705/45 |
| 7,447,347 B2 | 11/2008 | Weber |
| 7,455,220 B2 | 11/2008 | Phillips |
| 7,455,221 B2 | 11/2008 | Sheaffer |
| 7,460,108 B2 | 12/2008 | Tamura |
| 7,461,779 B2 | 12/2008 | Ramachandran |
| 7,461,780 B2 | 12/2008 | Potts |
| 7,471,818 B2 | 12/2008 | Price |
| 7,475,040 B2 | 1/2009 | Buchanan |
| 7,477,923 B2 | 1/2009 | Wallmark |
| 7,480,382 B2 | 1/2009 | Dunbar |
| 7,480,422 B2 | 1/2009 | Ackley et al. |
| 7,489,953 B2 | 2/2009 | Griffin |
| 7,490,242 B2 | 2/2009 | Torres |
| 7,497,429 B2 | 3/2009 | Reynders |
| 7,503,486 B2 | 3/2009 | Ahles |
| 7,505,759 B1 | 3/2009 | Rahman |
| 7,506,261 B2 | 3/2009 | Satou |
| 7,509,287 B2 | 3/2009 | Nutahara |
| 7,512,564 B1 | 3/2009 | Geer |
| 7,519,560 B2 | 4/2009 | Lam |
| 7,520,420 B2 | 4/2009 | Phillips |
| 7,520,422 B1 | 4/2009 | Robinson et al. |
| 7,536,354 B1 | 5/2009 | deGroeve |
| 7,536,440 B2 | 5/2009 | Budd |
| 7,539,646 B2 | 5/2009 | Gilder |
| 7,540,408 B2 | 6/2009 | Levine |
| 7,542,598 B2 | 6/2009 | Jones |
| 7,545,529 B2 | 6/2009 | Borrey et al. |
| 7,548,641 B2 | 6/2009 | Gilson |
| 7,566,002 B2 | 7/2009 | Love et al. |
| 7,571,848 B2 | 8/2009 | Cohen |
| 7,587,066 B2 | 9/2009 | Cordery et al. |
| 7,587,363 B2 | 9/2009 | Cataline |
| 7,590,275 B2 | 9/2009 | Clarke et al. |
| 7,599,543 B2 | 10/2009 | Jones |
| 7,599,888 B2 | 10/2009 | Manfre |
| 7,602,956 B2 | 10/2009 | Jones |
| 7,606,762 B1 | 10/2009 | Heit |
| 7,609,873 B2 | 10/2009 | Foth |
| 7,619,721 B2 | 11/2009 | Jones |
| 7,620,231 B2 | 11/2009 | Jones |
| 7,620,604 B1 | 11/2009 | Bueche, Jr. |
| 7,630,518 B2 | 12/2009 | Frew et al. |
| 7,644,043 B2 | 1/2010 | Minowa |
| 7,647,275 B2 | 1/2010 | Jones |
| 7,668,363 B2 | 2/2010 | Price |
| 7,672,940 B2 | 3/2010 | Viola |
| 7,676,409 B1 | 3/2010 | Ahmad |
| 7,680,735 B1 | 3/2010 | Loy |
| 7,689,482 B2 | 3/2010 | Lam |
| 7,697,776 B2 | 4/2010 | Wu et al. |
| 7,698,222 B1 | 4/2010 | Bueche, Jr. |
| 7,702,588 B2 | 4/2010 | Gilder |
| 7,734,545 B1 | 6/2010 | Fogliano |
| 7,743,979 B2 | 6/2010 | Fredman |
| 7,753,268 B1 | 7/2010 | Robinson et al. |
| 7,766,244 B1 | 8/2010 | Field |
| 7,769,650 B2 | 8/2010 | Bleunven |
| 7,792,752 B1 | 9/2010 | Kay |
| 7,792,753 B1 | 9/2010 | Slater et al. |
| 7,810,714 B2 | 10/2010 | Murata |
| 7,818,245 B2 | 10/2010 | Prakash et al. |
| 7,856,402 B1 | 12/2010 | Kay |
| 7,873,200 B1 | 1/2011 | Oakes, III et al. |
| 7,876,949 B1 | 1/2011 | Oakes, III et al. |
| 7,885,451 B1 | 2/2011 | Walls et al. |
| 7,885,880 B1 | 2/2011 | Prasad et al. |
| 7,894,094 B2 | 2/2011 | Nacman et al. |
| 7,896,232 B1 | 3/2011 | Prasad et al. |
| 7,900,822 B1 | 3/2011 | Prasad et al. |

| Patent/Pub No. | Date | Name |
|---|---|---|
| 7,912,785 B1 | 3/2011 | Kay |
| 7,949,587 B1 | 5/2011 | Morris et al. |
| 7,962,411 B1 | 6/2011 | Prasad et al. |
| 7,970,677 B1 | 6/2011 | Oakes, III et al. |
| 7,974,899 B1 | 7/2011 | Prasad et al. |
| 7,978,900 B2 | 7/2011 | Nepomniachtchi et al. |
| 7,996,314 B1 | 8/2011 | Smith et al. |
| 7,996,315 B1 | 8/2011 | Smith et al. |
| 7,996,316 B1 | 8/2011 | Smith et al. |
| 8,001,051 B1 | 8/2011 | Smith et al. |
| 8,046,301 B1 | 10/2011 | Smith et al. |
| 2001/0014881 A1 | 8/2001 | Drummond |
| 2001/0018739 A1 | 8/2001 | Anderson |
| 2001/0027994 A1 | 10/2001 | Hayashida |
| 2001/0037299 A1 | 11/2001 | Nichols et al. |
| 2001/0042171 A1 | 11/2001 | Vermeulen |
| 2001/0042785 A1 | 11/2001 | Walker |
| 2001/0043748 A1 | 11/2001 | Wesolkowski |
| 2001/0047330 A1 | 11/2001 | Gephart |
| 2001/0054020 A1 | 12/2001 | Barth et al. |
| 2002/0001393 A1 | 1/2002 | Jones et al. |
| 2002/0016763 A1 | 2/2002 | March |
| 2002/0016769 A1 | 2/2002 | Barbara et al. |
| 2002/0032656 A1 | 3/2002 | Chen |
| 2002/0038289 A1 | 3/2002 | Lawlor et al. |
| 2002/0052841 A1 | 5/2002 | Guthrie |
| 2002/0052853 A1 | 5/2002 | Munoz |
| 2002/0065786 A1 | 5/2002 | Martens et al. ............... 705/70 |
| 2002/0072974 A1 | 6/2002 | Pugliese |
| 2002/0075524 A1 | 6/2002 | Blair |
| 2002/0084321 A1 | 7/2002 | Martens |
| 2002/0087467 A1 | 7/2002 | Mascavage, III et al. |
| 2002/0107809 A1 | 8/2002 | Biddle et al. |
| 2002/0116329 A1 | 8/2002 | Serbetcioglu |
| 2002/0116335 A1 | 8/2002 | Star |
| 2002/0118891 A1 | 8/2002 | Rudd |
| 2002/0120562 A1 | 8/2002 | Opiela |
| 2002/0129249 A1 | 9/2002 | Maillard et al. |
| 2002/0133409 A1 | 9/2002 | Sawano et al. |
| 2002/0138522 A1 | 9/2002 | Muralidhar |
| 2002/0147798 A1 | 10/2002 | Huang |
| 2002/0150279 A1 | 10/2002 | Scott |
| 2002/0152160 A1 | 10/2002 | Allen-Rouman et al. |
| 2002/0152161 A1 | 10/2002 | Aoike |
| 2002/0152164 A1 | 10/2002 | Dutta |
| 2002/0152165 A1 | 10/2002 | Dutta et al. |
| 2002/0152169 A1* | 10/2002 | Dutta et al. ............... 705/45 |
| 2002/0171820 A1 | 11/2002 | Okamura |
| 2002/0178112 A1 | 11/2002 | Goeller et al. |
| 2002/0188564 A1 | 12/2002 | Star |
| 2002/0195485 A1 | 12/2002 | Pomerleau et al. |
| 2003/0005326 A1 | 1/2003 | Flemming |
| 2003/0023557 A1 | 1/2003 | Moore |
| 2003/0038227 A1 | 2/2003 | Sesek |
| 2003/0055756 A1 | 3/2003 | Allan |
| 2003/0055776 A1 | 3/2003 | Samuelson |
| 2003/0074315 A1 | 4/2003 | Lam |
| 2003/0075596 A1 | 4/2003 | Koakutsu |
| 2003/0075916 A1 | 4/2003 | Gorski |
| 2003/0081824 A1 | 5/2003 | Mennie |
| 2003/0093367 A1 | 5/2003 | Allen-Rouman et al. |
| 2003/0093369 A1 | 5/2003 | Ijichi et al. |
| 2003/0102714 A1 | 6/2003 | Rhodes et al. |
| 2003/0105688 A1 | 6/2003 | Brown et al. |
| 2003/0105714 A1 | 6/2003 | Alarcon-Luther et al. |
| 2003/0139999 A1 | 7/2003 | Rowe |
| 2003/0159046 A1 | 8/2003 | Choi et al. |
| 2003/0167225 A1 | 9/2003 | Adams |
| 2003/0191615 A1 | 10/2003 | Bailey |
| 2003/0191869 A1 | 10/2003 | Williams |
| 2003/0200174 A1 | 10/2003 | Star |
| 2003/0212904 A1 | 11/2003 | Randle et al. |
| 2003/0217005 A1 | 11/2003 | Drummond et al. |
| 2003/0225705 A1 | 12/2003 | Park et al. |
| 2003/0233278 A1 | 12/2003 | Marshall |
| 2003/0233318 A1 | 12/2003 | King et al. |
| 2004/0010466 A1 | 1/2004 | Anderson |
| 2004/0012496 A1 | 1/2004 | De Souza |
| 2004/0013284 A1 | 1/2004 | Yu |
| 2004/0024626 A1 | 2/2004 | Bruijning |
| 2004/0024708 A1 | 2/2004 | Masuda |
| 2004/0030741 A1 | 2/2004 | Wolton et al. |
| 2004/0057697 A1 | 3/2004 | Renzi |
| 2004/0058705 A1 | 3/2004 | Morgan |
| 2004/0066031 A1 | 4/2004 | Wong |
| 2004/0069841 A1 | 4/2004 | Wong |
| 2004/0071333 A1 | 4/2004 | Douglas et al. |
| 2004/0076320 A1 | 4/2004 | Downs, Jr. |
| 2004/0078299 A1 | 4/2004 | Down-Logan |
| 2004/0080795 A1 | 4/2004 | Bean |
| 2004/0089711 A1 | 5/2004 | Sandru |
| 2004/0093303 A1 | 5/2004 | Picciallo |
| 2004/0093305 A1 | 5/2004 | Kight |
| 2004/0103057 A1 | 5/2004 | Melbert et al. |
| 2004/0103296 A1 | 5/2004 | Harp |
| 2004/0109596 A1 | 6/2004 | Doran |
| 2004/0110975 A1 | 6/2004 | Osinski et al. |
| 2004/0117302 A1 | 6/2004 | Weichert et al. |
| 2004/0122754 A1 | 6/2004 | Stevens |
| 2004/0133511 A1 | 7/2004 | Smith et al. |
| 2004/0138974 A1 | 7/2004 | Shimamura |
| 2004/0148235 A1 | 7/2004 | Craig |
| 2004/0158549 A1 | 8/2004 | Matena |
| 2004/0165096 A1 | 8/2004 | Maeno |
| 2004/0170259 A1 | 9/2004 | Park |
| 2004/0210515 A1 | 10/2004 | Hughes |
| 2004/0210523 A1 | 10/2004 | Gains et al. |
| 2004/0228277 A1 | 11/2004 | Williams |
| 2004/0236647 A1 | 11/2004 | Acharya |
| 2004/0236688 A1 | 11/2004 | Bozeman |
| 2004/0240722 A1 | 12/2004 | Tsuji et al. |
| 2004/0245324 A1 | 12/2004 | Chen |
| 2004/0247199 A1 | 12/2004 | Murai et al. |
| 2004/0248600 A1 | 12/2004 | Kim |
| 2004/0252679 A1 | 12/2004 | William |
| 2004/0260636 A1 | 12/2004 | Marceau |
| 2004/0267666 A1 | 12/2004 | Minami |
| 2005/0001421 A1 | 1/2005 | Luth et al. |
| 2005/0010108 A1 | 1/2005 | Rahn et al. |
| 2005/0021466 A1 | 1/2005 | Buchanan et al. |
| 2005/0033645 A1 | 2/2005 | Duphily |
| 2005/0033685 A1 | 2/2005 | Reyes |
| 2005/0033695 A1 | 2/2005 | Minowa |
| 2005/0035193 A1 | 2/2005 | Gustin et al. |
| 2005/0038746 A1 | 2/2005 | Latimer et al. |
| 2005/0038754 A1 | 2/2005 | Geist |
| 2005/0044042 A1 | 2/2005 | Mendiola |
| 2005/0044577 A1 | 2/2005 | Jerding |
| 2005/0049950 A1 | 3/2005 | Johnson |
| 2005/0071283 A1 | 3/2005 | Randle et al. |
| 2005/0075969 A1 | 4/2005 | Nielson et al. |
| 2005/0075974 A1 | 4/2005 | Turgeon |
| 2005/0078336 A1 | 4/2005 | Ferlitsch |
| 2005/0080725 A1 | 4/2005 | Pick |
| 2005/0082364 A1 | 4/2005 | Alvarez et al. |
| 2005/0086140 A1 | 4/2005 | Ireland |
| 2005/0086168 A1 | 4/2005 | Alvarez |
| 2005/0091161 A1 | 4/2005 | Gustin |
| 2005/0096992 A1 | 5/2005 | Geisel |
| 2005/0097046 A1 | 5/2005 | Singfield |
| 2005/0108164 A1 | 5/2005 | Salafia |
| 2005/0108168 A1 | 5/2005 | Halpin |
| 2005/0115110 A1 | 6/2005 | Dinkins |
| 2005/0125338 A1 | 6/2005 | Tidwell et al. |
| 2005/0125360 A1 | 6/2005 | Tidwell et al. |
| 2005/0127160 A1 | 6/2005 | Fujikawa |
| 2005/0131820 A1 | 6/2005 | Rodriguez |
| 2005/0149436 A1 | 7/2005 | Elterich |
| 2005/0168566 A1 | 8/2005 | Tada |
| 2005/0171899 A1 | 8/2005 | Dunn |
| 2005/0171907 A1 | 8/2005 | Lewis |
| 2005/0177499 A1 | 8/2005 | Thomas |
| 2005/0177518 A1 | 8/2005 | Brown |
| 2005/0182710 A1 | 8/2005 | Andersson |
| 2005/0188306 A1 | 8/2005 | Mackenzie |
| 2005/0205661 A1 | 9/2005 | Taylor |
| 2005/0209961 A1 | 9/2005 | Michelsen |
| 2005/0228733 A1 | 10/2005 | Bent |

| | | | | | | |
|---|---|---|---|---|---|---|
| 2005/0252955 A1 | 11/2005 | Sugai | | 2007/0110277 A1 | 5/2007 | Hayduchok et al. |
| 2005/0267843 A1 | 12/2005 | Acharya et al. | | 2007/0118472 A1 | 5/2007 | Allen-Rouman et al. |
| 2005/0268107 A1 | 12/2005 | Harris et al. | | 2007/0122024 A1 | 5/2007 | Haas et al. |
| 2005/0269412 A1 | 12/2005 | Chiu | | 2007/0127805 A1 | 6/2007 | Foth et al. |
| 2005/0273368 A1 | 12/2005 | Hutten et al. | | 2007/0129955 A1 | 6/2007 | Dalmia |
| 2005/0278250 A1 | 12/2005 | Zair | | 2007/0136198 A1 | 6/2007 | Foth |
| 2005/0281448 A1 | 12/2005 | Lugg | | 2007/0140545 A1 | 6/2007 | Rossignoli |
| 2005/0281471 A1 | 12/2005 | LeComte | | 2007/0140594 A1 | 6/2007 | Franklin |
| 2005/0281474 A1 | 12/2005 | Huang | | 2007/0143208 A1 | 6/2007 | Varga |
| 2005/0289030 A1 | 12/2005 | Smith | | 2007/0150337 A1 | 6/2007 | Hawkins et al. |
| 2005/0289182 A1 | 12/2005 | Pandian et al. | | 2007/0156438 A1 | 7/2007 | Popadic et al. |
| 2006/0002426 A1 | 1/2006 | Madour | | 2007/0168265 A1 | 7/2007 | Rosenberger |
| 2006/0004660 A1 | 1/2006 | Pranger | | 2007/0171288 A1 | 7/2007 | Inoue |
| 2006/0025697 A1 | 2/2006 | Kurzweil | | 2007/0172107 A1 | 7/2007 | Jones et al. |
| 2006/0039628 A1 | 2/2006 | Li et al. | | 2007/0172148 A1 | 7/2007 | Hawley |
| 2006/0039629 A1 | 2/2006 | Li | | 2007/0179883 A1 | 8/2007 | Questembert |
| 2006/0041506 A1 | 2/2006 | Mason et al. | | 2007/0183000 A1 | 8/2007 | Eisen et al. |
| 2006/0045321 A1 | 3/2006 | Yu | | 2007/0194102 A1 | 8/2007 | Cohen et al. |
| 2006/0047593 A1 | 3/2006 | Naratil | | 2007/0198432 A1 | 8/2007 | Pitroda et al. |
| 2006/0053056 A1 | 3/2006 | Alspach-Goss | | 2007/0203708 A1 | 8/2007 | Polcyn |
| 2006/0059085 A1 | 3/2006 | Tucker | | 2007/0208816 A1 | 9/2007 | Baldwin et al. |
| 2006/0064368 A1 | 3/2006 | Forte | | 2007/0235518 A1 | 10/2007 | Mueller et al. |
| 2006/0080245 A1 | 4/2006 | Bahl | | 2007/0235520 A1 | 10/2007 | Smith |
| 2006/0085357 A1* | 4/2006 | Pizarro ............................ 705/64 | | 2007/0241179 A1 | 10/2007 | Davis et al. |
| 2006/0102704 A1 | 5/2006 | Reynders | | 2007/0244782 A1 | 10/2007 | Chimento |
| 2006/0106691 A1 | 5/2006 | Sheaffer | | 2007/0246525 A1 | 10/2007 | Smith et al. |
| 2006/0106717 A1 | 5/2006 | Randle et al. | | 2007/0251992 A1 | 11/2007 | Sharma |
| 2006/0110063 A1 | 5/2006 | Weiss | | 2007/0255652 A1 | 11/2007 | Tumminaro |
| 2006/0112013 A1 | 5/2006 | Maloney | | 2007/0255653 A1 | 11/2007 | Tumminaro |
| 2006/0115110 A1 | 6/2006 | Rodriguez | | 2007/0255662 A1 | 11/2007 | Tumminaro |
| 2006/0115141 A1 | 6/2006 | NaohikoKoakutsu | | 2007/0258634 A1 | 11/2007 | Simonoff |
| 2006/0118613 A1 | 6/2006 | McMann | | 2007/0271182 A1 | 11/2007 | Prakash et al. |
| 2006/0144924 A1 | 7/2006 | Stover | | 2007/0278286 A1 | 12/2007 | Crowell et al. |
| 2006/0144950 A1 | 7/2006 | Johnson | | 2007/0288380 A1 | 12/2007 | Starrs |
| 2006/0161501 A1 | 7/2006 | Waserstein | | 2007/0288382 A1 | 12/2007 | Narayanan |
| 2006/0164682 A1 | 7/2006 | Lev | | 2007/0295803 A1 | 12/2007 | Levine et al. |
| 2006/0167818 A1 | 7/2006 | Wentker et al. | | 2008/0002911 A1 | 1/2008 | Eisen |
| 2006/0182331 A1 | 8/2006 | Gilson et al. | | 2008/0021802 A1 | 1/2008 | Pendleton |
| 2006/0182332 A1 | 8/2006 | Weber | | 2008/0040280 A1 | 2/2008 | Davis |
| 2006/0206506 A1 | 9/2006 | Fitzpatrick | | 2008/0052182 A1 | 2/2008 | Marshall |
| 2006/0210138 A1 | 9/2006 | Hilton et al. | | 2008/0059376 A1 | 3/2008 | Davis et al. |
| 2006/0214940 A1 | 9/2006 | Kinoshita | | 2008/0063253 A1 | 3/2008 | Wood |
| 2006/0215204 A1 | 9/2006 | Miyamoto et al. | | 2008/0068674 A1 | 3/2008 | McIntyre |
| 2006/0215230 A1 | 9/2006 | Borrey et al. | | 2008/0071721 A1 | 3/2008 | Wang et al. |
| 2006/0222260 A1 | 10/2006 | Sambongi et al. | | 2008/0080760 A1 | 4/2008 | Ronca et al. |
| 2006/0229976 A1 | 10/2006 | Jung | | 2008/0086420 A1 | 4/2008 | Gilder et al. |
| 2006/0229986 A1 | 10/2006 | Corder | | 2008/0086421 A1 | 4/2008 | Gilder |
| 2006/0238503 A1 | 10/2006 | Smith | | 2008/0091599 A1 | 4/2008 | Foss, Jr. |
| 2006/0242062 A1 | 10/2006 | Peterson et al. | | 2008/0097899 A1 | 4/2008 | Jackson et al. |
| 2006/0242063 A1 | 10/2006 | Peterson | | 2008/0103790 A1 | 5/2008 | Abernethy |
| 2006/0249567 A1 | 11/2006 | Byrne et al. | | 2008/0103967 A1 | 5/2008 | Ackert et al. |
| 2006/0274164 A1 | 12/2006 | Kimura et al. | | 2008/0113674 A1 | 5/2008 | Baig |
| 2006/0279628 A1 | 12/2006 | Fleming | | 2008/0114739 A1 | 5/2008 | Hayes |
| 2006/0282383 A1 | 12/2006 | Doran | | 2008/0117991 A1 | 5/2008 | Peddireddy |
| 2006/0291744 A1 | 12/2006 | Ikeda et al. | | 2008/0119178 A1 | 5/2008 | Peddireddy |
| 2007/0016796 A1 | 1/2007 | Singhal | | 2008/0133411 A1 | 6/2008 | Jones |
| 2007/0019243 A1 | 1/2007 | Sato | | 2008/0147549 A1 | 6/2008 | Rathbun |
| 2007/0022053 A1 | 1/2007 | Waserstein | | 2008/0156438 A1 | 7/2008 | Stumphauzer et al. |
| 2007/0027802 A1 | 2/2007 | VanDeburg et al. | | 2008/0162350 A1 | 7/2008 | Allen-Rouman et al. |
| 2007/0031022 A1 | 2/2007 | Frew | | 2008/0162371 A1 | 7/2008 | Rampell et al. |
| 2007/0038561 A1 | 2/2007 | Vancini et al. | | 2008/0177659 A1 | 7/2008 | Lacey et al. |
| 2007/0041629 A1 | 2/2007 | Prakash et al. | | 2008/0180750 A1 | 7/2008 | Feldman |
| 2007/0050292 A1 | 3/2007 | Yarbrough | | 2008/0208727 A1 | 8/2008 | McLaughlin et al. |
| 2007/0053574 A1 | 3/2007 | Verma et al. | | 2008/0214180 A1 | 9/2008 | Cunningham et al. |
| 2007/0058851 A1 | 3/2007 | Quine | | 2008/0219543 A1 | 9/2008 | Csulits |
| 2007/0063016 A1 | 3/2007 | Myatt | | 2008/0245869 A1 | 10/2008 | Berkun et al. |
| 2007/0064991 A1 | 3/2007 | Douglas et al. | | 2008/0247629 A1 | 10/2008 | Gilder |
| 2007/0065143 A1 | 3/2007 | Didow et al. | | 2008/0247655 A1 | 10/2008 | Yano |
| 2007/0075772 A1 | 4/2007 | Kokubo | | 2008/0249931 A1 | 10/2008 | Gilder |
| 2007/0076940 A1 | 4/2007 | Goodall et al. | | 2008/0249951 A1 | 10/2008 | Gilder et al. |
| 2007/0076941 A1 | 4/2007 | Carreon et al. | | 2008/0262953 A1 | 10/2008 | Anderson |
| 2007/0077921 A1 | 4/2007 | Hayashi | | 2008/0275821 A1 | 11/2008 | Bishop et al. |
| 2007/0080207 A1 | 4/2007 | Williams | | 2008/0316542 A1 | 12/2008 | Mindrum et al. |
| 2007/0082700 A1 | 4/2007 | Landschaft | | 2009/0024520 A1 | 1/2009 | Drory et al. |
| 2007/0084911 A1 | 4/2007 | Crowell | | 2009/0046938 A1 | 2/2009 | Yoder |
| 2007/0086642 A1 | 4/2007 | Foth et al. | | 2009/0060396 A1 | 3/2009 | Blessan et al. |
| 2007/0086643 A1 | 4/2007 | Spier | | 2009/0108080 A1 | 4/2009 | Meyer |
| 2007/0094088 A1 | 4/2007 | Mastie | | 2009/0110281 A1 | 4/2009 | Hirabayashi |
| 2007/0100748 A1 | 5/2007 | Dheer | | 2009/0141962 A1 | 6/2009 | Borgia |

| | | | |
|---|---|---|---|
| 2009/0171819 | A1 | 7/2009 | Emde et al. |
| 2009/0171825 | A1 | 7/2009 | Roman |
| 2009/0173781 | A1 | 7/2009 | Ramachandran |
| 2009/0190823 | A1 | 7/2009 | Walters |
| 2009/0192938 | A1 | 7/2009 | Amos |
| 2009/0236413 | A1 | 9/2009 | Mueller et al. |
| 2009/0252437 | A1 | 10/2009 | Li |
| 2009/0254447 | A1 | 10/2009 | Blades |
| 2009/0281904 | A1 | 11/2009 | Pharris |
| 2009/0313167 | A1 | 12/2009 | Dujari |
| 2010/0007899 | A1 | 1/2010 | Lay |
| 2010/0027679 | A1 | 2/2010 | Sunahara et al. |
| 2010/0047000 | A1 | 2/2010 | Park et al. |
| 2010/0057578 | A1 | 3/2010 | Blair et al. |
| 2010/0061446 | A1 | 3/2010 | Hands et al. |
| 2010/0082470 | A1 | 4/2010 | Walach |
| 2010/0165015 | A1 | 7/2010 | Barkley et al. |
| 2010/0260408 | A1 | 10/2010 | Prakash et al. |
| 2010/0262522 | A1 | 10/2010 | Anderson et al. |
| 2010/0312705 | A1 | 12/2010 | Caruso et al. |
| 2011/0112967 | A1 | 5/2011 | Anderson et al. |

OTHER PUBLICATIONS

Federal Check 21 Act, "New Check 21 Act Effective Oct. 28, 2004: Banks No Longer Will Return Original Cancelled Checks," Consumer Union's FAQ's and Congressional Testimony on Check 21, www.consumerlaw.org/initiatives/content/check21_content.html, downloaded Dec. 2005, 20 pages.
The Automated Clearinghouse, "Retail Payment Systems; Payment Instruments, Clearing and Settlement; The Automated Clearinghouse (ACH)," www.ffiec.gov/ffiecinfobase/booklets/Retail/retail_02d.html, downloaded Dec. 2005, 3 pages.
Fest, G., "Patently Unaware," *Bank Technology News*, Apr. 2006, Retrieved from the Internet at URL: http://banktechnews.com/article.html?id=20060403T7612618, 5 pages.
Website: Blue Mountain Consulting, URL: www.bluemountainconsulting.com/, Downloaded Apr. 26, 2006, 3 pages.
U.S. Appl. No. 11/320,998, filed Dec. 29, 2005, Luby et al.
U.S. Appl. No. 11/321,025, filed Dec. 29, 2005, Luby et al.
U.S.Appl. No. 11/321,027, filed Dec. 29, 2009, Luby et al.
"Accept "Customer Not Present" Checks," Accept Check Online, http://checksoftware.com, Cited in patent No. 7,900,822, as dated 2007 (1 pg).
"Adjusting Brightness and Contrast", www.eaglesoftware.com/adjustin.htm, retrieved on May 4, 2009 (4 pgs).
"Best practices for producing quality digital image files," Digital Images Guidelines, http://deepblue.lib.umich.edu/bitstream/2027.42/40247/1/Images-Best_Practice.pdf, downloaded 2007 (2 pgs).
"Chapter 7 Payroll Programs," Uniform Staff Payroll System, http://www2.oecn.k12.oh.us/www/ssdt/usps/usps_user_guide_005.html, Cited in patent No. 7,900,822, as dated 2007 (9 pgs).
"Check 21 Solutions," Columbia Financial International, Inc. http://www.columbiafinancial.us/check21/solutions.htm, Cited in patent No. 7,900,822, as dated 2007 (8 pgs).
"Check Fraud: A Guide to Avoiding Losses", All Net, http://all.net/books/audit/checkfraud/security.htm, Cited in patent No. 7,900,822, as dated 2007 (1 pg).
"Customer Personalized Bank Checks and Address Labels" Checks Your Way Inc., http://www.checksyourway.com/htm/web_pages/faq.htm, Cited in patent No. 7,900,822, as dated 2007 (6 pgs).
"Direct Deposit Application for Payroll", Purdue University, Business Office Form 0003, http://purdue.edu/payroll/pdf/directdepositapplication.pdf, Jul. 2007 (2 pgs).
"Direct Deposit," University of Washington, http://www.washington.edu/admin/payroll/directdeposit.html, Cited in patent No. 7,900,822, as dated 2007 (3 pgs).
"Frequently Asked Questions" Bank of America, http://www/bankofamerica.com/deposits/checksave/index.cfm?template-lc_faq_bymail, Cited in patent No. 7,900,822, as dated 2007 (2 pgs).
"How to Digitally Deposit a Check Image", Smart Money Daily, Copyright 2008 (5 pgs).
"ImageNet Mobile Deposit Provides Convenient Check Deposit and Bill Pay to Mobile Consumers," Miteksystems, 2008 (2 pgs).
"It's the easiest way to Switch banks", LNB, http://www.inbky.com/pdf/LNBswitch-kit10-07.pdf Cited in patent No. 7,996,316, as dated 2007 (7 pgs).
"Lesson 38—More Bank Transactions", Turtle Soft, http://www.turtlesoft.com/goldenseal-software-manual.lesson38.htm, Cited in patent No. 7,900,822, as dated 2007 (8 pgs).
"Mitek Systems Announces Mobile Deposit Application for Apple iPhone," http://prnewswire.com/cgi-bin/stories/pl?ACCT=104&STORY=/www/story/10-01-..., Nov. 25, 2008, pp. 1-2.
"Personal Finance", PNC, http://www.pnc.com/webapp/unsec/productsandservice.do?sitearea=/PNC/home/personal/account+services/quick+switch/quick+switch+faqs, Cited in patent No. 7,900,822, as dated 2007 (12 pgs).
"Refractive index" Wikipedia, the free encyclopedia; http://en.wikipedia.org./wiki/refractiveindex.com Oct. 16, 2007 (4 pgs).
"Remote Deposit Capture", Plante & Moran, http://plantemoran.com/industries/fincial/institutions/bank/resources/community+bank+advisor/2007+summer+issue/remote+deposit+capture.htm, Cited in patent No. 7,900,822, as dated 2007 (3 pgs).
"Remote Deposit" National City, http://www.nationalcity.com/smallbusiness/cashmanagement/remotedeposit/default.asp; Cited in patent No. 7,900,822, as dated 2007 (1 pg).
"Save on ATM Fees", RedEye Edition, Chicago Tribune, Chicago, IL Jun. 30, 2007 (2 pgs).
"Switching Made Easy," Bank of North Georgia, http://www.banknorthgeorgia.com/cmsmaster/documents/286/documents616.pdf, 2007 (7 pgs).
"Virtual Bank Checks", Morebusiness.com, http://www.morebusiness.com/running_your business/businessbits/d908484987.brc, Cited in patent No. 7,900,822, as dated 2007 (3 pgs).
"WallStreetGrapevine.com" Stocks on the Rise: JADG, BKYI, MITK; Mar. 3, 2008 (4 pgs).
"What is check Fraud", National Check Fraud Center, http://www.ckfraud.org/ckfraud.html , Cited in patent No. 7,900,822, as dated 2007 (12 pgs).
Albrecht, W. Steve, "Check Kiting: Detection, Prosecution and Prevention," The FBI Law Enforcement Bulletin, Nov. 1, 1993 (6 pgs).
Alves, Vander and Borba, Paulo; "Distributed Adapters Pattern: A Design for Object-Oriented Distributed Applications"; First Latin American Conference on Pattern Languages of Programming; Oct. 2001; pp. 132-142; Rio de Janeiro, Brazil (11 pgs).
Archive Index Systems; Panini My Vision X-30 or VX30 or X30 © 1994-2008 Archive Systems, Inc. P./O. Box 40135 Bellevue, WA USA 98015 (2 pgs).
Automated Merchant Systems, Inc., "Electronic Check Conversion," http://www.automatedmerchant.com/electronic_check_conversion.cfm, 2006, downloaded Oct. 18, 2006 (3 pgs).
BLM Technologies, "Case Study: Addressing Check 21 and RDC Error and Fraud Threats," Remote Deposit Capture News Articles from Jun. 11, 2007, Retrieved from http://www.remotedepositcapture.com/News/june_11_2007.htm on Feb. 18, 2008 (5pgs).
Canon, ImageFormula CR-25/CR-55, "Improve Your Bottom Line with Front-Line Efficiencies", 0117W117, 1207-55/25-1 OM-BSP, Cited in U.S. Pat. No. 7,949,587 as dated 2007 (4 pgs).
Carrubba, P. et al., "Remote Deposit Capture: A White Paper Addressing Regulatory, Operational and Risk Issues," NetDeposit Inc., 2006 (11 pgs).
Century Remote Deposit High-Speed Scanner User's Manual Release, 2006 (Century Manual) (32 pgs).
Debello, James et al., "RDM and Mitek Systems to Provide Mobile Check Deposit," Mitek Systems, Inc., San Diego, California and Waterloo, Ontario, (Feb. 24, 2009) (2 pgs).
DeYoung, Robert; "The Financial Performance of Pure Play Internet Banks"; Federal Reserve Bank of Chicago Economic Perspectives; 2001; pp. 60-75; vol. 25, No. 1 (16pgs).
De Jesus, A. et al., "Distributed Check Processing in a Check 21 Environment: An educational overview of the opportunities and challenges associated with implementing distributed check imaging and processing solutions," Panini, 2004, pp. 1-22.

ElectronicPaymentProviders, Inc., "FAQs: ACH/ARC, CheckVerification/Conversion/Guarantee, RCK Check Re-Presentment," http://www.useapp.com/faq.htm, downloaded Oct. 18, 2006 (3 pgs).

Federal Reserve System, "12 CFR, Part 229: Availability of Funds and Collection of Checks," Federal Registrar, Apr. 28, 1997, pp. 1-50.

Federal Reserve System, "Part IV, 12 CFR Part 229: Availability of Funds and Collection of Checks; Final Rule," Federal Registrar, vol. 69, No. 149, Aug. 4, 2004, pp. 47290-47328.

Fidelity Information Services, "Strategic Vision Embraces Major Changes in Financial Services Solutions: Fidelity's long-term product strategy ushers in new era of application design and processing," Insight, 2004, pp. 1-14.

Fisher, Dan M., "Home Banking in the 21st Century: Remote Capture Has Gone Retail", May 2008 (4 pgs).

Garry, M., "Checking Options: Retailers face an evolving landscape for electronic check processing that will require them to choose among several scenarios," Supermarket News, vol. 53, No. 49, 2005 (3 pgs).

Gupta, Maya R. et al., "OCR binarization and image pre-processing for searching historical documents," Pattern Recognition, vol. 40, No. 2, Feb. 2007, pp. 389-397.

Hale, J., "Picture this: Check 21 uses digital technology to speed check processing and shorten lag time," Columbus Business First, http://columbus.bizjournals.com/columbus/stories/2005/03/14focus1.html, downloaded 2007 (3 pgs).

Hildebrand, C. et al., "Electronic Money," Oracle, http://www.oracle.com/oramag/profit/05-feb/p15financial.html, 2005, downloaded Oct. 18, 2006 (5 pgs).

Hillebrand, G., "Questions and Answers About the Check Clearing for the 21st Century Act, 'Check 21," ConsumersUnion.org, http://www.consumersunion.org/finance/ckclear1002.htm, Jul. 27, 2004, downloaded Oct. 18, 2006 (6 pgs).

Image Master, "Photo Restoration: We specialize in digital photo restoration and photograph repair of family pictures", http://www.imphotorepair.com, Cited in patent No. 7,900,822, as downloaded Apr. 2007 (1 pg).

Investment Systems Company, "Portfolio Accounting System," 2000, pp. 1-32.

JBC: "What is a MICR Line," eHow.com (2 pgs).

Kendrick, Kevin B., "Check Kiting, Float for Purposes of Profit," Bank Security & Fraud Prevention, vol. 1, No. 2, 1994 (3 pgs).

Kiser, Elizabeth K.; "Modeling the Whole Firm: The Effect of Multiple Inputs and Financial Intermediation on Bank Deposit Rates;" FEDS Working Paper No. 2004-07, Jun. 3, 2003 (46 pgs).

Levitin, Adam J., "Remote Deposit Capture: A Legal and Transactional Overview," Banking Law Journal, 2009, pp. 115-122.

Matthews, Deborah, "Advanced Technology Makes Remote Deposit Capture Less Risky," Indiana Bankers Association, Apr. 2008 (2 pgs).

Metro 1 Credit Union, "Remote Banking Services," hltp://ww\\i.metro1cu.org/metro1cu/remote.html, downloaded Apr. 17, 2007 (4 pgs).

Mitek Systems: Mitek Systems Launches First Mobile Check Deposit and Bill Pay Application, San Diego, CA, Jan. 22, 2008 (3 pgs).

Moreau, T., "Payment by Authenticated Facsimile Transmission: a Check Replacement Technology for Small and Meduim Enterprises," CONNOTECH Experts-conseils, Inc., Apr. 1995 (31 pgs).

Nelson, B. et al., "Remote deposit capture changes the retail landscape," Northwestern Financial Review, http://findarticles.com/p/articles/mi qa3799/is200607/ai_n16537250, 2006 (3 pgs).

NetBank, Inc., "Branch Out: Annual Report 2004," 2004 (150 pgs).

NetBank, Inc., "Quick Post: Deposit and Payment Forwarding Service," 2005 (1 pg).

NetDeposit Awarded Two Patents for Electronic Check Process, Jun. 18, 2007 (1 pg).

Nixon, Julie et al., "Fisery Research Finds Banks are Interested in Offering Mobile Deposit Capture as an," Fiserv, Inc. Brookfield, Wis., (Business Wire), (Feb. 20, 2009) (2 pgs).

Online Deposit: Frequently Asked Questions, http://www.depositnow.com/faq.html, Copyright 2008 (1 pg).

Patterson, Scott "USAA Deposit@Home—Another WOW moment for Net Banking", NextCU.com, Jan. 26, 2007 (5 pgs).

Rao, Bharat; "The Internet and the Revolution in Distribution: A Cross-Industry Examination"; Technology in Society; 1999; pp. 287-306; vol. 21, No. 3 (20 pgs).

Remotedepsitcapture.com, LLC, "Remote Deposit Capture Overview," ROC Overview, http://remotedepositcapture.com/overview/RDC_overview.htm, Cited in patent No. 7,900,822, as dated Mar. 12, 2007 (4 pgs).

SoyBank Anywhere, "Consumer Internet Banking Service Agreement," Dec. 6, 2004 (6 pgs).

Teixeira, D, "Comment: Time to Overhaul Deposit Processing Systems," American Banker, Dec. 10, 1998, vol. 163, No. 235, p. 15. (3 pgs).

Thailandguru.com: How and where to Pay Bills @ www.thailandguru.com/paying-bills.html (2 pgs).

Valentine, Lisa, "Remote Deposit Capture Hot Just Got Hotter," ABA Banking Journal, Mar. 2006, p. 1-9.

Whitney et al., "Reserve Banks to Adopt DSTU X9.37-2003 Format for Check 21 Image Services", American Bankers Association, May 18, 2004, http://www.aba/com/NR/rdonlyres/CBDC1 A5C-43E3-43CC-B733-BE417C638618/35930/DSTUFormat.pdf (2 pgs.).

Wikipedia ®, "Remote Deposit," http://en.wikipedia.org/wiki/Remote_deposit, 2007 (3 pgs).

Woody Baird Associated Press, "Pastors Wife got Scammed—She Apparently Fell for Overseas Money Scheme," The Commerical Appeal, Jul. 1, 2006, p. A. 1.

Zions Bancorporation, "Moneytech, the technology of money in our world: Remote Deposit," http://www.bankjunior.com/pground/moneytech/remote_deposit.jsp, 2007 (2 pgs).

Office Action from corresponding U.S. Appl. No. 12/951,143 dated Oct. 19, 2011 (14 pages).

Office Action from corresponding U.S. Appl. No. 11/591,014 dated Aug. 8, 2008 (10 pages).

Final Office Action from corresponding U.S. Appl. No. 11/591,014 dated Dec. 10, 2008 (11 pages).

Office Action from corresponding U.S. Appl. No. 11/590,971 dated Oct. 31, 2007 (9 pages).

Final Office Action from corresponding U.S. Appl. No. 11/590,971 dated Apr. 16, 2008 (12 pages)..

Office Action from corresponding U.S. Appl. No. 11/590,971, dated Jan. 21, 2009 (11 pages).

Office Action from corresponding U.S. Appl. No. 11/591,247 dated Nov. 23, 2009 (13 pages).

Final Office Action from corresponding U.S. Appl. No. 11/591,247 dated May 5, 2010 (16 pages).

Notice of Allowance from corresponding U.S. Appl. No. 11/591,247 dated Sep. 8, 2010 (10 pages).

Office Action from corresponding U.S. Appl. No. 11/591,025 dated Dec. 1, 2009, (15 pages).

Notice of Allowance from corresponding U.S. Appl. No. 11/591,025 dated Apr. 20, 2010 (10 pages).

Notice of Allowance from corresponding U.S. Appl. No. 11/591,025 dated Aug. 20, 2010 (9 pages).

Leaning, Jeffrey Scott (Reg. No. 51,184); "Remarks and Conclusion" in Response to Office Action mailed Nov. 27, 2007; Response submitted to the USPTO on Feb. 20, 2008; U.S. Appl. No. 09/506,434, filed Feb. 18, 2000; 6 pages.

Shelby, Hon. Richard C. (Chairman, Committee on Banking, Housing and Urban Affairs); "Check Truncation Act of 2003", Calendar No. 168, 108th Congress, 1st Session Senate Report 108-79. Jun. 25, 2003. 9 pages.

Public Law 108-100—108th Congress; "An Act—Check Clearing for the 21st Century Act", Oct. 28, 2003 [H.R. 1474], 117 STAT. 1177,12 USC 5001. 18 pages.

Johnson, Jennifer J., Secretary of the Board; Federal Reserve System, 12 CFR Part 229, Regulation CC; "Availability of Funds and Collection of Checks", downloaded 2009, pp. 1-89.

Oxley, Michael G., from the committee of conference; "Check Clearing for the 21st Century Act", 108th Congress—1st Session, House of Representatives, Report 108-291. Oct. 1, 2003—ordered to be printed. [To accompany H.R. 1474]. pp. 1-27.

Oxley, Michael G., from the Committee on Financial Services; "Check Clearing for the 21st Century Act", 108th Congress—1st Session, House of Representatives, Report 108-132. Jun. 2, 2003. [To accompany H. R. 1474]. pp. 1-20.

Board of Governors of the Federal Reserve System, "Report to Congress on the Check Clearing for the 21st Century Act of 2003", Apr. 2007, Submitted to the Congress pursuant to section 16 of the Check Clearing for the 21st Century Act of 2003. 59 pages.

Rivlin, Alice M. et al., Chair, Vice Chair—Board of Governors, Committee on the Federal Reserve in the Payments Mechanism—Federal Reserve System, "The Federal Reserve in the Payments Mechanism", Jan. 1998. 41 pages.

Craig, Ben; "Resisting Electronic Payment Systems: Burning Down the House?", Federal Reserve Bank of Cleveland, Jul. 1999, 4 pages.

Furst, Karen et al., "Internet Banking: Developments and Prospects", Office of the Comptroller of the Currency—Economic and Policy Analysis Working Paper, Sep. 2000.

Wells Fargo—2005 News Releases, "The New Wells Fargo Electronic Deposit Services Break Through Banking Boundaries in the Age of Check 21", San Francisco—Mar. 28, 2005. Retrieved from the internet <https://www.wellsfargo.com/press/3282005_Check21?year=2005>.

Constanzo, Chris. "Remote Check Deposit: Wells Captures A New Checking Twist", Bank Technology News Article—May 2005. Retrieved from the internet <https://www.americanbanker.com/btn_article.html?id=20050502YQ50FSYG>. 2 pages.

Credit Union Journal, "AFCU Averaging 80 DepositHome Transactions Per Day", Credit Union Journal—Monday, Aug. 15, 2005. 1 page.

Bank Systems & Technology, Untitled Article, May 1, 2006. Retrieved from the internet <https://www.banktech.com/showArticle.jhtml?articleID=187003126>. pp. 1-4. Copyright 2004-2005 CMP Media, LLC.

Digital Transactions News, "An ACH-Image Proposal for Checks Roils Banks and Networks", May 26, 2006. 3 pages.

BankServ Press Release, "BankServ Announces New Remote Deposit Product Integrated With QuickBooks", San Francisco, Jul. 6, 2006. Retrieved from RemoteDepositCapture.com. pp. 1-3.

Remote Deposit Capture News Article, "PNC Bank to Offer Ease of Online Deposit Service Integrated with QuickBooks to Small Businesses", Remote Deposit Capture News Articles from Jul. 24, 2006. Retrieved from RemoteDepositCapture.com. pp. 1-2.

Association of German Banks, SEPA 2008: Uniform Payment Instruments for Europe, Berlin, Jul. 2007. Publisher: Bundesverband deutscher Banken e. V.

DCU Member's Monthly—Jan. 2008, "PC Deposit—Deposit Checks from Home!", Retrieved from the internet <https://www.mycreditunionnewsletter.com/dcu/0108/pagel.html>. pp. 1-2. Copyright 2008 Digital Federal Credit Union.

WindowsForDevices.com, "Software lets camera phone users deposit checks, pay bills", Jan. 29, 2008. Retrieved from the internet <https://www.windowsfordevices.com/news/NS3934956670html>. 3 pages.

CNN.com/technology, "Scan, deposit checks from home", Feb. 7, 2008. Retrieved from the internet <https://www.cnn.com/2008/TECH/biztech/02/07/check.scanning.ap/index.html>. downloaded 2009, 3 pages.

eCU Technologies, "Upost Remote Deposit Solution", Retrieved from the internet <https://www.eutechnologies.com/products/upost.html>. downloaded 2009, 1 page.

The Green Sheet 2.0 :: Newswire, "CO-OP adds home deposit capabilities to suite of check imaging products", Retrieved from the internet, downloaded 2009, <https://www.greensheet.com/newswire.php?newswire_id=8799. pp. 1-2.

CreativePaymentSolutions.com, "Creative Payment Solutions—WebSolution", Retrieved from the internet <http://www.creativepaymentsolutions.com/cps/financial_services/websolution/default.html>. Copyright © 2008, Creative Payment Solutions, Inc.

Wells Fargo Commercial, "Remote Deposit", Retrieved from the internet <https://www.wellsfargo.com/com/treasury_mgmt/receivables/electronic/remote_deposit>. © 1999-2008 Wells Fargo. All rights reserved.

Bruene, Jim; "Digital Federal Credit Union and Four Others Offer Consumer Remote Deposit Capture Through EasCorp", NetBanker—Tracking Online Finance. Apr. 13, 2008 9:23 PM.

Retrieved from the internet <http://www.netbanker.com/2008/04/digital_federal_credit_union_a.html> © 1995-2007, Financial Insite, Inc.

Credit Union Journal, "The Ramifications of Remote Deposit Capture Success", Credit Union Journal—Monday, Apr. 14, 2008. Retrieved from the internet <http://www.cujournal.com/printthis.html?id=20080411E0DZT57G>. 1 page.

Bruene, Jim; "CheckFree to Enable In-home Remote Check Deposits for Consumers and Small Businesses", NetBanker.com, Feb. 5, 2008 12:23 PM. Retrieved from the internet <http://www.netbanker.com/2008/02/ checkfree_to_enable_inhome_rem.html>. © 1995-2007, Financial Insite, Inc.

Mitek systems, "ImageNet Mobile Deposit—Provides Convenient Check Deposit and Bill Pay to Mobile Consumers", <http://www.miteksystems.com>. downloaded 2009, 2 pages.

Chiang, Chuck Chiang / The Bulletin, "Remote banking offered", Published: Feb. 1, 2006 4:00AM PST. Retrieved from the internet <http://bendbulletin.com/apps/pbcs.dll/article?AID=/20060201/BIZ0102/602010327&templ...>. 2 pages.

fBankServ, "DepositNow: What's the difference?", Copyright 2006, DepositNow.

http://www.bankserv.com/products/remotedeposit.htm, Copyright 2006, BankServ.

Amber Avalona-Butler / Paraglide, "At Your Service: Best iPhone Apps for Military Lifestyle," Jul. 9, 2010 (2 pgs).

Bruno, M., "Instant Messaging, Bank Technology News," Dec. 2002 (3 pgs).

EFT Network Unveils FAXTellerPlus, EFT Network, Inc., www.eftnetwork.com, Jan. 13, 2009 (2 pgs).

Richey, J. C. et al., "EE 4530 Check Imaging," Nov. 18, 2008 (10 pgs).

Wolfe, Daniel, "Check Image Group Outlines Agenda," American Banker, New York, N.Y.: Feb. 13, 2009, vol. 174, Iss. 30, p. 12. (2 pgs).

Claims as filed on Jan. 20, 2011 for U.S. Appl. No. 13/010,644 (9 pgs).

Claims as filed on Jan. 31, 2011 for U.S. Appl. No. 13/017,865 (11 pgs).

Application as filed on Oct. 8, 2007 for U.S. Appl. No. 11/868,884 (30 pgs).

Claims as filed on Oct. 8, 2007 for U.S. Appl. No. 11/868,878 (4 pgs).

Application as filed on Oct. 29, 2007 for U.S. Appl. No. 11/926,388 (23 pgs).

Application as filed on Oct. 30, 2007 for U.S. Appl. No. 11/928,297 (26 pgs).

Application as filed on Oct. 31, 2007 for U.S. Appl. No. 11/931,670 (47 pgs).

Claims as filed on Oct. 31, 2007 for U.S. Appl. No. 11/931,804 (4 pgs).

Application as filed on Oct. 31, 2007 for U.S. Appl. No. 11/930,537 (27 pgs).

Application as filed on Apr. 3, 2008 for U.S. Appl. No. 12/062,143 (27 pgs).

Claims as filed on Apr. 3, 2008 for U.S. Appl. No. 12/062,163 (3 pgs).

Claims as filed on Apr. 3, 2008 for U.S. Appl. No. 12/062,175 (3 pgs).

Claims as filed on Feb. 16, 2011 for U.S. Appl. No. 13/028,477 (3 pgs).

Application as filed on Jun. 11, 2008 for U.S. Appl. No. 12/137,051 (29 pgs).

Application as filed on Aug. 21, 2008 for U.S. Appl. No. 12/195,723 (38 pgs).

Claims as filed on Sep. 2, 2008 for U.S. Appl. No. 12/202,781 (4 pgs).

Application as filed on Sep. 8, 2008 for U.S. Appl. No. 12/205,996 (30 pgs).

Claims as filed on Sep. 8, 2008 for U.S. Appl. No. 12/206,001 (3 pgs).

Claims as filed on Sep. 8, 2008 for U.S. Appl. No. 12/206,007 (3 pgs).

Claims as filed on May 2, 2011 for U.S. Appl. No. 13/098,566 (10 pgs).

Claims as filed on May 18, 2011 for U.S. Appl. No. 13/110,077 (9 pgs).

Claims as filed on Oct. 24, 2008 for U.S. Appl. No. 12/257,471 (4 pgs).

Application as filed on Oct. 17, 2008 for U.S. Appl. No. 12/253,278 (42 pgs).
Application as filed on Feb. 18, 2009 for U.S. Appl. No. 12/388,005 (37 pgs).
Application as filed on Mar. 4, 2009 for U.S. Appl. No. 12/397,671 (40 pgs).
Application as filed on Mar. 4, 2009 for U.S. Appl. No. 12/397,930 (37 pgs).
Application as filed on Aug. 21, 2009 for U.S. Appl. No. 12/545,127 (45 pgs).
Application as filed on Jul. 27, 2009 for U.S. Appl. No. 12/509,613 (48 pgs).
Application as filed on Jul. 27, 2009 for U.S. Appl. No. 12/509,680 (41 pgs).
Application as filed on Jul. 13, 2006 for U.S. Appl. No. 11/487,537 (23 pgs).
Application as filed on Oct. 31, 2006 for U.S. Appl. No. 11/591,008 (27 pgs).
Claims as filed on Oct. 31, 2006 for U.S. Appl. No. 11/590,995 (3 pgs).
Claims as filed on Dec. 8, 2010 for U.S. Appl. No. 12/963,513 (7 pgs).
Claims as filed on Oct. 31, 2006 for U.S. Appl. No. 11/590,963 (3 pgs).
Application as filed on Oct. 31, 2006 for U.S. Appl. No. 11/590,974 (31 pgs).
Application as filed on Oct. 31, 2006 for U.S. Appl. No. 11/591,273 (56 pgs).
Application as filed on Oct. 31, 2006 for U.S. Appl. No. 11/591,227 (58 pgs).
Claims as filed on Oct. 31, 2006 for U.S. Appl. No. 11/590,998 (4 pgs).
Application as filed on Mar. 15, 2007 for U.S. Appl. No. 11/686,924 (34 pgs).
Application as filed on Mar. 15, 2007 for U.S. Appl. No. 11/686,928 (36 pgs).
Claims as filed on Mar. 15, 2007 for U.S. Appl. No. 11/686,925 (5 pgs).
Application as filed on May 10, 2007 for U.S. Appl. No. 11/747,222 (35 pgs).
Claims as filed on May 10, 2007 for U.S. Appl. No. 11/747,223 (4 pgs).
Application as filed on Oct. 23, 2007 for U.S. Appl. No. 11/877,335 (29 pgs).
Claims as filed on Oct. 23, 2007 for U.S. Appl. No. 11/877,382 (6 pgs).
Application as filed on Oct. 23, 2007 for U.S. Appl. No. 11/876,925 (36 pgs).
Application as filed on Aug. 28, 2009 for U.S. Appl. No. 12/549,443 (41 pgs).
Application as filed on Dec. 20, 2006 for U.S. Appl. No. 11/613,656 (21 pgs).
Claims as filed on Dec. 20, 2006 for U.S. Appl. No. 11/613,671 (3 pgs).
Application as filed on Oct. 25, 2007 for U.S. Appl. No. 11/923,839 (22 pgs).
Application as filed on Aug. 19, 2010 for U.S. Appl. No. 12/859,741 (235 pgs).
Claims as filed on Aug. 19, 2010 for U.S. Appl. No. 12/859,752 (5 pgs).
Application as filed on Sep. 28, 2007 for U.S. Appl. No. 11/864,569 (35 pgs).
Application as filed on Dec. 30, 2010 for U.S. Appl. No. 12/982,494 (280 pgs).
Application as filed on Dec. 30, 2010 for U.S. Appl. No. 12/982,561 (275 pgs).
Application as filed on Dec. 30, 2010 for U.S. Appl. No. 12/982,578 (274 pgs).
Application as filed on Dec. 30, 2010 for U.S. Appl. No. 12/982,594 (275 pgs).
Application as filed on Jun. 8, 2011 for U.S. Appl. No. 13/155,976 (352 pgs).
Application as filed on Jun. 8, 2011 for U.S. Appl. No. 13/156,007 (356 pgs).
Application as filed on Jun. 8, 2011 for U.S. Appl. No. 13/156,018 (353 pgs).
Claims as filed on Dec. 15, 2011 for U.S. Appl. No. 13/327,478 (4 pgs).
White, J.M. et ai, "lmageThreshoulding for Optical Character Recognition and Other Applications Requiring Character Image Extraction", IBM J. Res. Develop, 1983, vol. 27.
Ritzer, J.R. "Hinky Dinky helped spearhead POS, remote banking movement", Bank System & Equipment, vol. 21, No. 12 pp. 51-54, Dec. 1984.
Dinan, R.F. Dinan et al., "lmagePlus High Performance Transaction System", IBM Systems Journal; 1990, pp. 431-434; vol. 29, No. 3.
Gupta, Amar et al., "An Integrated Architecture for Recognition of Totally Unconstrained Handwritten Numerals"; International Journal of Pattern Recognition and Artificial Intelligence; 1993, pp. 757-773; vol. 7, No. 4.
Masonson, L. "Check truncation and ACH trends—automated clearing houses," healthcare financial management association, http://WWN.findarticles.com/p/articles/mLm3276/is_n7_v47/ai_14466034/print, 1993.
Zhang, C.Y., "Robust Estimation and Image Combining," Astronomical Data Analysis Software and Systems IV, ASP Conference Series, 1995.
Kornai Andras et al., "Recognition of Cursive Writing on Personal Checks," Proceedings of International Workshop on the Frontiers in Handwriting Recognition, Sep. 1996, pp. 1-6.
De Queiroz, Ricardo et al., "Mixed RasterContent (MRC) Model for Compound Image Compression", pp. 1-12.
J.D. Tygar, Atomicity in Electronic Commerce, Apr./May 1998 (Atomicity).
Anderson, Milton M. "FSML and Echeck", Financial Services Technology Consortium, 1999.
"Full Service Direct Deposit," www.nonprofitstaffing.com/images/upload/dirdepform.pdf, 2001.
Rose, Sarah et al., "Best of the Web: The Top 50 Financial Websites." Money, New York Dec. 1999, vol. 28, iss12; pp. 178-187.
Middleware', URL: http://www.cs.umanitoba.ca/maheswar/anc2002/PAPERS/bak01.pdf, Jun. 24, 2008.
Palacios, Rafael et al., "Automatic Processing of Brazilian Bank Checks", Machine Vision and Applications; 2002, pp. 1-28.
Peter, J. Wallison, "Wal-Mart Case Exposes Flaws in Banking-Commerce Split", American Banker, vol. 167. No. 8, Jan. 17, 2002.
Heckenberg, D., "Using Mac OSX for Real-Time Image Processing," 2003.
Burnett, J., "Depository Bank Endorsement Requirements," Bankersonline.com, http://www.bankersonline.com/cgi-ban/printview.pl, 2003.
Blafore, Bonnie, "Lower Commissions, Fewer Amenities." Better Investing. Madison Heights: Feb. 2003, vol. 52, iss 6; pp. 50-51.
"Direct Deposit Authorization Form" www.umass.edu/humres/library/DDForm.pdf, 2003.
Electronic Billing Problem: The E-check is in the mail-American Banker-v168, n 95, 91, May 2003.
Knestout, Brian P. et al., "Banking Made Easy" Kiplinger's Personal Fiance, Washington :Jul. 2003, vol. 57 iss 7; pp. 44-47.
Mohl, Bruce, "Banks Reimbursing ATM Fee to Compete With Larger Rivals." Boston Globe, Boston, MA., Sep. 2004, pp. 1E.
"Two Words Every Business Should Know: Remote Deposit," Canon, http://www.rpsolutions.com/rpweb/pdfs/ canon_rdc.pdf, 2005.
Integrated Data, Message, and Process Recovery for Failure Masking in Web Services, Dissertation zur Erlangung des Grades des Doktors der Ingenieurwissenschaften der Naturwissenschaftlich-Technischen Fakultat I der Universitat des Saari andes, Saarbrucken, im Juli 2005.
Remotedepositcapture, URL: www.remotedepositcapture.com, 2006.
Onlinecheck.com/Merchant Advisors, "real-Time Check Debit", Merchant Advisors: Retail Check Processing Check Conversion, http://www.onlinecheck/wach/rcareal.htm, 2006.
"Compliance with Regulation CC," http://www/federalreserve.org/Pubsregccregcc.htm, Jan. 24, 2006, 6 pgs.

Federal Reserve Board, "Check Clearing for the 21st Century Act," FRB, http://www.federalreserve.gov/paymentsystems/turncation/, 2006.

BankServ Press release, "BankServ Announces New Remote Deposit Product Integrated With QuickBooks", San Francisco, Jul. 6, 2006, Remotedepositcapture.com, pp. 1-3.

Dias, Danilo et al., "A Model for the Electronic Representation of Bank Checks", Universidade de Brasilia.

Website: RemoteDepositCapture.com, URL: www.RemoteDepositCapture.com/, 2006, 5 pages.

Application as filed on Feb. 15, 2012 for U.S. Appl. No. 13/397,405 (19 pgs).

Claims as filed on Dec. 29, 2005 for U.S. Appl. No. 11/320,998 (3 pgs).

Claims as filed on Dec. 29, 2005 for U.S. Appl. No. 11/321,027 (3 pgs).

Claims as filed on Feb. 15, 2012 for U.S. Appl. No. 13/397,437 (6 pgs).

Office Action dated Jun. 13, 2012 from corresponding U.S. Appl. No. 12/963,513 (15 pgs).

Office Action from corresponding U.S. Appl. No. 11/591,003 dated Mar. 17, 2008 (11 pgs).

Final Office Action from corresponding U.S. Appl. No. 11/591,003 dated Oct. 17, 2008 (11 pgs).

Office Action from corresponding U.S. Appl. No. 11/591,003 dated Dec. 10, 2009 (14 pgs).

Final Office Action from corresponding U.S. Appl. No. 11/591,003 dated Jun. 9, 2010 (15 pgs).

Office Action from corresponding U.S. Appl. No. 11/591,003 dated Jun. 27, 2011 (13 pgs).

Final Office Action from corresponding U.S. Appl. No. 11/591,003 dated Jan. 24, 2012 (12 pgs).

Office Action from corresponding U.S. Appl. No. 11/590,974 dated May 14, 2008 (7 pgs).

Office Action from corresponding U.S. Appl. No. 11/590,974 dated Nov. 12, 2008 (13 pgs).

Final Office Action from corresponding U.S. Appl. No. 11/590,974 dated Nov. 3, 2009 (6 pgs).

Office Action from corresponding U.S. Appl. No. 13/397,437 dated Apr. 2, 2012 (11 pgs).

Office Action from corresponding U.S. Appl. No. 11/320,998 dated Jul. 3, 2008 (11 pgs).

Final Office Action from corresponding U.S. Appl. No. 11/320,998 dated Jan. 6, 2009 (13 pgs).

Office Action from corresponding U.S. Appl. No. 11/320,998 dated Sep. 3, 2009 (14 pgs).

Final Office Action from corresponding U.S. Appl. No. 11/320,998 dated Apr. 13, 2010 (12 pgs).

Office Action from corresponding U.S. Appl. No. 11/320,998 dated Mar. 30, 2011 (12 pgs).

Final Office Action from corresponding U.S. Appl. No. 11/320,998 dated Sep. 15, 2011 (15 pgs).

Office Action from corresponding U.S. Appl. No. 11/321,027 dated Jan. 10, 2008 (7 pgs).

Final Office Action from corresponding U.S. Appl. No. 11/321,027 dated Sep. 29, 2008 (13 pgs).

Office Action from corresponding U.S. Appl. No. 11/321,027 dated Jun. 17, 2009 (15 pgs).

Final Office Action from corresponding U.S. Appl. No. 11/321,027 dated Jan. 5, 2010 (16 pgs).

Office Action from corresponding U.S. Appl. No. 11/321,027 dated Mar. 31, 2011 (17 pgs).

Final Office Action from corresponding U.S. Appl. No. 11/321,027 dated Sep. 15, 2011 (17 pgs).

Office Action dated May 28, 2009 from corresponding U.S. Appl. No. 11/321,025 (12 pgs).

Final Office Action dated Mar. 29, 2010 from corresponding U.S. Appl. No. 11/321,025 (12 pgs).

Office Action dated Mar. 30, 2011 from corresponding U.S. Appl. No. 11/321,025 (10 pgs).

Final Office Action dated Sep. 15, 2011 from corresponding U.S. Appl. No. 11/321,025 (12 pgs).

Office Action dated Jul. 7, 2008 from corresponding U.S. Appl. No. 11/591,131 (8 pgs).

Final Office Action dated Jan. 23, 2009 from corresponding U.S. Appl. No. 11/591,131 (9 pgs).

Office Action dated Jun. 16, 2009 from corresponding U.S. Appl. No. 11/591,131 (12 pgs).

Final Office Action dated Jan. 22, 2010 from corresponding U.S. Appl. No. 11/591,131 (13 pgs).

Office Action dated Mar. 31, 2011 from corresponding U.S. Appl. No. 11/591,131 (12 pgs).

Final Office Action dated Sep. 15, 2011 from corresponding U.S. Appl. No. 11/591,131 (14 pgs).

* cited by examiner

SYSTEMS AND METHODS FOR REMOTE DEPOSIT OF CHECKS

CROSS-REFERENCE TO RELATED APPLICATIONS

This application is related by subject matter to U.S. patent application Ser. No. 11/591,014, U.S. patent application Ser. No. 11/590,971, U.S. patent application Ser. No. 11/591,247, now U.S. Pat. No. 7,873,200, U.S. patent application Ser. No. 11/591,025, now U.S. Pat. No. 7,876,949, U.S. patent application Ser. No. 11/591,003, and U.S. patent application Ser. No. 11/590,974, all filed on Oct. 31, 2006, and also entitled "Systems and Methods for Remote Deposit of Checks."

This application is also related by subject matter to U.S. patent application Ser. No. 11/321,025, U.S. patent application Ser. No. 11/321,027, U.S. patent application Ser. No. 11/320,998 all filed on Dec. 29, 2005 and entitled "Remote Deposit of Checks," and U.S. patent application Ser. No. 11/591,131 filed Oct. 31, 2006 also entitled "Remote Deposit of Checks."

BACKGROUND

As described in U.S. patent application Ser. No. 11/321,025, checks typically provide a safe and convenient method for an individual to purchase goods and/or services. To use a check, the individual usually must open a checking account, or other similar account, at a financial institution and deposit funds, which are then available for later withdrawal. To pay for goods and/or services with a check, the payor (i.e., the buyer) usually designates a payee (i.e., the seller) and an amount payable on the check. In addition, the payor often signs the check. Once the check has been signed, it is usually deemed negotiable, meaning the check may be validly transferred to the payee upon delivery. By signing and transferring the check to the payee, the payor authorizes funds to be withdrawn from the payor's account on behalf of the payee in return for the goods and/or services provided by the payee.

Checks have certain advantages over other forms of payment, such as cash. For example, while often considered the most liquid type of asset, cash also may be the least secure. Unlike a check, cash is usually freely transferable and does not have to be endorsed. Thus, the owner and possessor of cash is most often the same individual. Because cash is freely transferable, cash that is lost or stolen typically cannot be recovered. Therefore, the risks associated with cash transactions are often unacceptable, particularly with respect to transactions not conducted in person (e.g., by mail) and/or involving large sums of money. A check, on the other hand, provides a payor with more security because the check usually requires a payor to specify both the person and amount to be paid. Furthermore, as noted above, the check is usually not valid until it is properly signed by the payor. These safeguards help to reduce the risk that money will be lost and/or stolen and ensure that the proper payee receives the proper amount of money.

Cash may have other disadvantages as well. For example, because cash is freely transferable, there may be little or no verifiable transaction history. It is often desirable for a payor and/or payee to have physical proof that a particular transaction took place. This typically requires that the payor receive a receipt. However, receipts may contain errors and can be easily misplaced. In contrast, a bank processing a check will ordinarily create a transaction history, which may include the identity of the payee, the amount to be paid, the date of the payment, and the signature of the payor. This enables both a payor and payee to independently verify the accuracy of most transactions involving a payment by check.

While a check may provide a payor with a convenient and secure form of payment, receiving a check may put certain burdens on the payee, such as the time and effort required to deposit the check. For example, depositing a check typically involves going to a local bank branch and physically presenting the check to a bank teller. In addition to the time commitment that may be required, visiting a bank branch may be problematic for the payee if the bank's hours of operation coincide with the payee's normal hours of employment. Thus, the payee may be required to leave work early and/or change work schedules.

A check may pose other burdens for the payee. As noted above, a check may not be freely transferable, thereby limiting the payee's ability to use funds from the check. For example, it is usually difficult to for the payee to purchase goods and/or services using a check issued by the payor. While the check may be endorsed and accepted by a third party, such transactions are often disfavored because the third party may not know the payor and, thus, may not be willing to accept the risk that the payor has insufficient funds to cover the check. Therefore, the payee may not have access to the funds from the check until the payee deposits the check at the bank, the check has cleared and the funds have been credited to the payee's account. The payee may have to wait even longer if the payee chooses to deposit the check by mail. Therefore, there is a need for a convenient method of remotely depositing a check while enabling the payee to quickly access the funds from the check.

SUMMARY

The described embodiments contemplate a system, method and computer-readable medium with computer-executable instructions for remotely redeeming a negotiable instrument. In an embodiment, the novel method may include delivering, via a publicly accessible computer network, a software component to a customer-controlled general purpose computer. The customer is instructed to identify an account via said computer, and to provide an image of at least a front side of a check, for example by scanning the check and appropriately rotating and cropping the scanned image as necessary. The image passes from scanner or other image capture apparatus to the software component, which manages delivery to bank servers.

In another embodiment, the novel method may include receiving, at a server computer, a customer request for a customer capability to make at least one check deposit from a customer-controlled general purpose computer. The software component for facilitating a check image capture process is then delivered to the customer. A customer identification of an account for a deposit and an image of a front side of a check is received, and optical character recognition (OCR) is performed on a Magnetic Ink Character Recognition (MICR) line location of the image. The received information and OCR information can be used in completing the deposit.

In another embodiment, the novel method may include receiving a customer identification of an account for a deposit, receiving a first image of a front side of a check, wherein said first image is in a first file format, e.g. JPEG, and wherein said first image is received from a customer-controlled general purpose computer. A second image of said front side of a check may then be created by converting said first image into a second file format, e.g. a bi-tonal TIFF. A log file may be generated comprising one or more of said first image and said second image, in addition to a variety of other potentially useful information for processing and/or troubleshooting the deposit transaction.

Additional advantages and features of the invention are described below.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the invention is not limited to the specific methods and instrumentalities disclosed. In the drawings.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
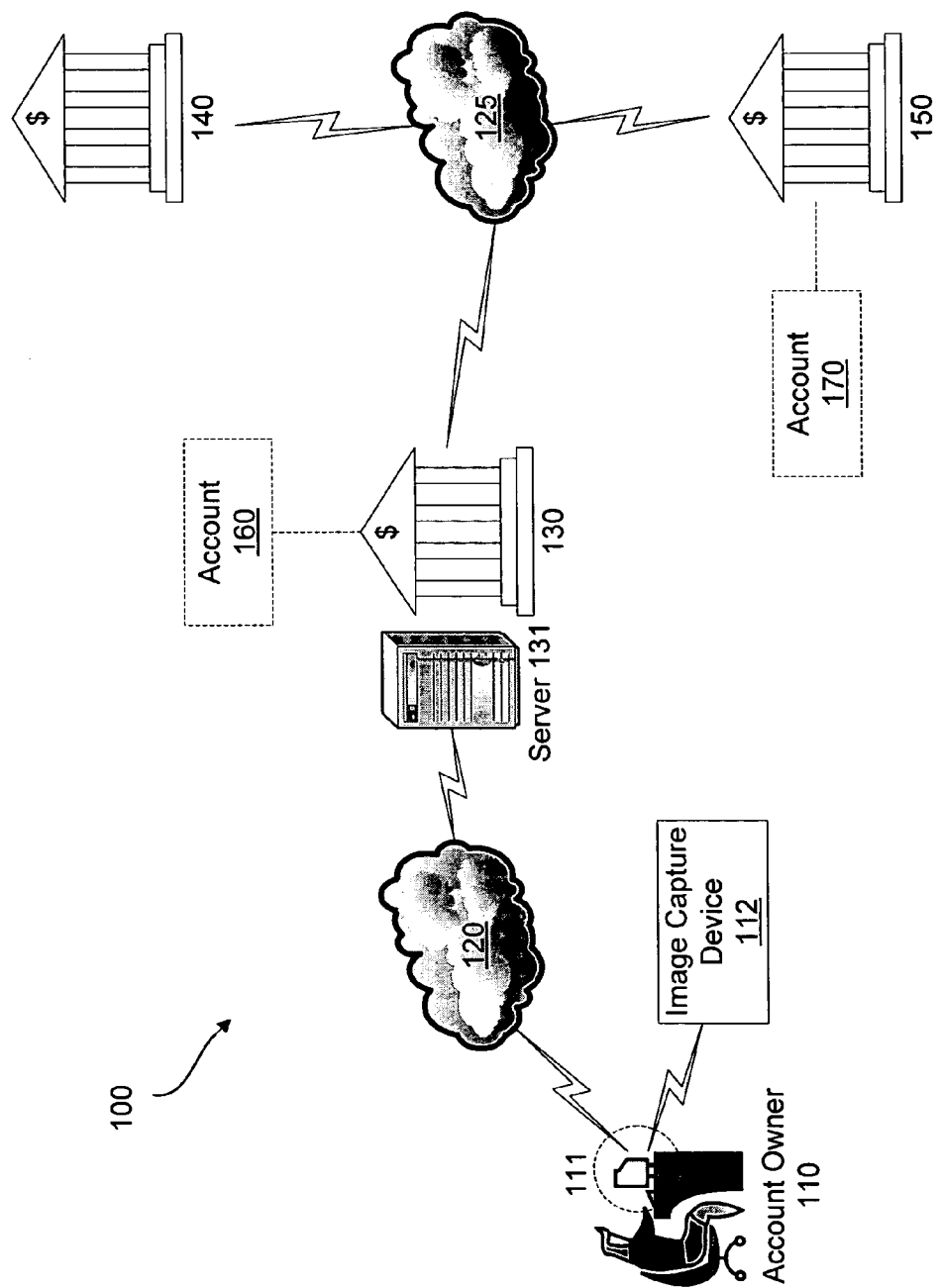
FIG. 1 illustrates a broad view of a system in which the described embodiments may be employed.

FIG. 1 illustrates an example system in which the described embodiments may be employed. System 100 may include account owner 110, e.g., a bank customer who may be located, for example, at the customer's private residence. The account owner 110 may be utilizing a customer-controlled, general purpose computer 111. A general purpose computer 111 is generally a Personal Computer (PC) running one of the well-known WINDOWS® brand operating systems made by MICROSOFT® Corp., or a MACINTOSH® (Mac) brand computer, running any of the APPLE® operating systems. General purpose computers are ubiquitous today and the term should be well understood. A general purpose computer 111 may be in a desktop or laptop configuration, and generally has the ability to run any number of applications that are written for and compatible with the computer's operating system. The term "general purpose computer" specifically excludes specialized equipment as may be purchased by a business or other commercial enterprise, for example, for the specialized purpose of high-speed, high-volume check deposits. A particular advantage of embodiments of the invention is its ability to operate in conjunction with electronics that today's consumers actually own or can easily acquire, such as a general purpose computer, a scanner, and a digital camera.

General purpose computer 111 may also be "customer-controlled." A common example of a customer-controlled computer would be a typical computer located in a private residence. The owner of such a computer typically has the power to install programs and configure the computer as they wish, subject to certain security restrictions that may be imposed by the hardware or software manufacturers. A customer-controlled computer need not be located in a private residence, however. For example, computers in college dormitories, in workplace offices, and so forth may also be considered to be "customer-controlled."

An example of a computer that would not be considered customer-controlled would be an Automatic Teller Machine (ATM) that is typically controlled by a bank or other business. Although a customer may access and utilize an ATM machine, the ATM machine is not customer-controlled because the allowed uses of the ATM machine are highly restricted. Relevant factors in determining whether a machine is customer controlled are thus the scope of operations that a customer may perform using the machine, and extent to which the customer can reconfigure the machine in some way by adding software and/or hardware components.

One of the applications that may run on a general purpose computer 111 in connection with the invention is a browser. Common browsers in use today are, for example, the popular INTERNET EXPLORER® line of browsers made by MICROSOFT® Corp., the FIREFOX® browsers distributed via the MOZILLA® open source project, and the NETSCAPE NAVIGATOR® browsers also distributed via the MOZILLA® open source project. Browsers generally allow users to point to a Uniform Resource Locator (URL), and thereby retrieve information such as a web page. For example, a browser application on computer 111 could retrieve a web page that is kept at server 131, and display the web page to the account owner 110, as is generally known and appreciated in the industry and by the general public.

Another application, or set of applications, that may run on a general purpose computer 111 in connection with the invention comprises "virtual machine" technologies such as the JAVA® virtual machine software distributed by SUN MICROSYSTEMS® Corp, and .NET® Framework distributed by MICROSOFT® Corp. In general, such applications facilitate execution of computer programs in a variety of computing environments. For example, a JAVA® applet is a computer program (which may be alternatively referred to herein as a "software component") that can execute on any computer running the JAVA® virtual machine software. The applet may be provided to virtual machine software in a "source code" format, and may be compiled by a "just in time" compiler, so as to put the applet in a form that can be executed by the hardware associated with the particular computing device. These technologies are known in the art and may be utilized in connection with certain embodiments of the invention as described herein.

An image capture device 112 may be communicatively coupled to the computer 112. Image capture device may be, for example, a scanner or digital camera. Computer 111 may comprise software that allows the user to control certain operations of the image capture device 112 from the computer 111. For example, modern scanner users may be familiar with the TWAIN software often used to control image capture from a computer 111. Similarly, digital cameras often ship along with software that allows users to move images from the camera to a computer 111, and may also provide additional functions, such as photo editing functions crop and rotate.

Financial institutions 130, 140 and 150 may be any type of entity capable of processing a transaction involving a negotiable instrument. For example, financial institutions 130, 140 and 150 may be a retail bank, investment bank, investment company, regional branch of the Federal Reserve, clearinghouse bank and/or correspondent bank. A negotiable instrument is usually a type of contract that obligates one party to pay a specified sum of money to another party. By way of example, and not limitation, negotiable instruments may include a check, draft, bill of exchange, promissory note, and the like.

Financial institution 130 is illustrated as associated with a server 131. Financial institution 130 may maintain and operate server 131 for the purposes of communicating with customers such as 110. Alternatively, such server may be maintained and operated by one or more third party vendors who act under the instructions of the financial institution 130, but possess skills and resources that may be more effective in competent operation of electronics. Such arrangements are well known in the industry and in this case the server 131 is nonetheless considered to be "associated" with the financial institution 130.

Account owner 110 may be an individual who owns account 160, which may be held at financial institution 130. As such, account owner 110 may be described as a customer of financial institution 130. Account 160 may be any type of account for depositing funds, such as a savings account, checking account, brokerage account, and the like. Account owner 110 may communicate with financial institution 130 by way of communication network 120, which may include an intranet, the Internet, a local area network (LAN), a wide area network (WAN), a public switched telephone network (PSTN), a cellular network, a voice over internet protocol (VoIP) network, and the like. Account owner 110 may communicate with financial institution 130 by phone, email, instant messaging, facsimile, and the like.

In one contemplated embodiment, network 120 is a publicly accessible network such as the Internet, which can presently be accessed from many private residences and many public places such as college campuses, airports, coffee shops, and restaurants throughout the United States as well as many other countries of the world. A variety of technologies are available to establish secure connections over such a public network, so that data transmitted between computer 111 and a server 131 associated with the institution 130 remains either inaccessible or indecipherable by third parties that may intercept such data. The invention may make use of any such security technologies.

Financial institutions 130, 140 and 150 may communicate with each other via a network 125. Network 125 may be a publicly accessed network such as 120. Alternatively, network 125 may have certain characteristics that differ from network 120, due to the different requirements of bank-to-bank communications. For example, one might envision certain security features and access restrictions being more important in bank-to-bank communications.

In an embodiment, account owner 110 may wish to deposit a check that is drawn from account 170 at financial institution 150. Account owner 110 may deposit the check into account 160 by converting the check into electronic data and sending the data to financial institution 130. Aspects of the invention may thus comprise systems and methods carried out by the account owner 110 and his computer 111. Aspects of the invention may also comprise systems and methods carried out by the financial institution 130 and their server 131 or other electronics that facilitate and enable such deposit by the account owner 110.

For example, account owner 110 may convert the check into a digital image by scanning the front and/or back of the check using image capture device 112. Account owner 110 may then send the image to financial institution 130 using the systems and methods described herein. Please refer to FIG. 2 and corresponding description for a detailed exemplary embodiment of systems and methods for facilitating and processing a check deposit transaction. Upon receipt of the image, financial institution 130 may credit the funds to account 160. Financial institution 130 may clear the check by presenting the digital image to an intermediary bank, such as a regional branch of the Federal Reserve, a correspondent bank and/or a clearinghouse bank.

For example, the check may be cleared by presenting the digital image to financial institution 140, which may be a regional branch of the Federal Reserve, along with a request for payment. Financial institution 130 and 150 may have accounts at the regional branch of the Federal Reserve. As will be discussed in greater detail below, financial institution 130 may create a substitute check using the image provided by account owner 110 and present the substitute check to financial institution 140 for further processing. Upon receiving the substitute check, financial institution 140 may identify financial institution 150 as the paying bank (e.g., the bank from which the check is drawn). This may be accomplished using a nine-digit routing number located on the bottom left hand corner of the check. A unique routing number is typically assigned to every financial institution in the United States. Financial institution 140 may present the substitute check to financial institution 150 and request that the check be paid. If financial institution 150 verifies the check (i.e., agrees to honor the check), financial institution 140 may then settle the check by debiting funds from financial institution 150 and crediting funds to financial institution 130. Financial institution 150 may then debit funds from account 170.

It will be appreciated that the preceding examples are for purposes of illustration and explanation only, and that an embodiment is not limited to such examples. For example, financial institution 150 may be a correspondent bank (i.e., engaged in a partnership with financial institution 130). Thus, financial institution 130 may bypass the regional branch of the Federal Reserve and clear the check directly with financial institution 150. In addition, account 160 and account 170 may both be held at financial institution 130, in which case the check may be cleared internally.

Figure 2:
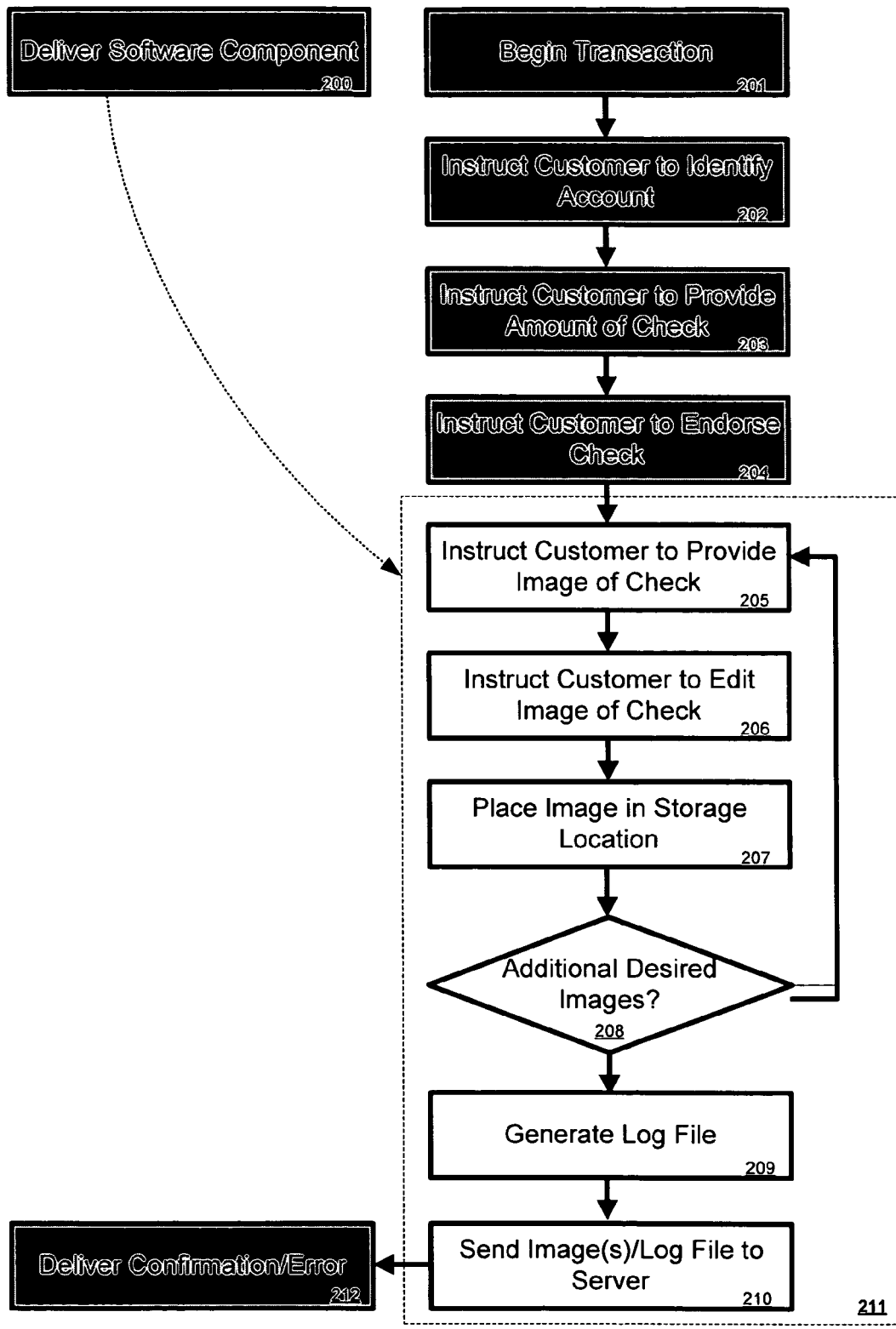
FIG. 2 illustrates a method for facilitating deposit of a check from a customer-controlled general purpose computer.

FIG. 2 illustrates a method for facilitating deposit of a check from a customer-controlled general purpose computer. The various steps of FIG. 2 may be viewed as performed by a server computer associated with a financial institution, in conjunction with a software component that operates from a customer-controlled general purpose computer. Various of the steps are contemplated as performed by the server, while various other steps are contemplated as performed by the software component.

In the embodiment illustrated in FIG. 2, the darker boxes indicate steps that are performed by the server, for example by delivering information to the user through the user's browser application. Making information available on a server to customers with a browser is considered to be effectively "delivering" such information for the purposes of this document. The lighter boxes inside 211 indicate steps that are performed by the software component, as it executes on the customer computer. Those of skill will recognize that alternative configurations are readily achievable by moving functions from server to software component or vice-versa.

The server may first deliver a software component to the customer-controlled general purpose computer 200. This may be done in response to a customer request for the capability of making deposits from his computer. In one embodiment, the financial institution may provide such capability only to customers that meet predetermined criteria of trustworthiness. For example, it can be required that the customer's accounts are in good standing, that the customer relationship has lasted a predetermined amount of time, that the customer has a predetermined number of financial service products with the financial institution (e.g. bank accounts, mortgages, insurance policies, etc.), that the customer has a predetermined level of assets with the financial institution, and so forth.

The software component may be configured to facilitate the deposit transaction in a variety of ways as illustrated herein. In one embodiment, the software component may be compatible with the JAVA® or .NET® technologies described above. Such configurations allow for widespread dissemination and successful operation in a wide variety of computing environments as may exist on customer-controlled general purpose computers.

Where the software component is written for JAVA®, .NET®, or any other such technology, it is useful in step 200 to first determine whether the customer-controlled general purpose computer has an appropriate virtual machine application installed, e.g. JAVA® Virtual Machine (JVM) or .NET® framework. If the computer does not have the appropriate application installed, such application may be automatically installed, or the customer may be directed to a location from which such application may be downloaded and installed. The software component may then be delivered 200, and should work as intended. The various other steps of FIG. 2 may now take place, or may take place at some subsequent time using the software component as previously downloaded.

After downloading or otherwise accepting the software component, and assuming the customer has an appropriate image capture device, the customer now has the capability to make deposits from his general purpose computer. For example, the customer points his browser to a bank website, where a link may be available that causes the bank server to initiate a deposit transaction 201. The customer may be asked to log in using a user name and password.

The customer may next be instructed to identify an account into which the deposit will be made 202. This can be done, for example, by providing a webpage that lists the available accounts, along with an instruction to select an account. Alternatively, a box may be provided into which the customer may type an account number, along with an appropriate instruction to type the number of the desired account. The account may be any account, and need not necessarily be the customer's own account, although it is contemplated that a large number of customer deposits may be made into the transacting customer's account, and embodiments may find it useful to restrict the allowed accounts to the customer's own accounts. In such embodiments, if the customer has just one account with the financial institution, step 202 may be eliminated because the only available allowed account would be the customer's single account.

The customer may next be instructed to identify an amount of a check or other negotiable instrument he wishes to deposit into the selected account 203. In one embodiment, this can be done similarly to step 202 by providing a webpage with a box into which the customer may type an amount, along with an appropriate instruction to type the amount of the check. The customer may also be instructed to endorse the check 204.

The customer may next be instructed to provide an image of a front side of a check 205, for example, by using an image capture device. In one embodiment, the customer may be instructed to place the check face down on a flatbed scanner, and may further be instructed as to the location and orientation of the check on the scanner. If the customer is instructed to take a digital photograph of the check using a digital camera, the customer may be instructed as to the position and orientation of the check, lighting, angle of camera, distance and focal length (zoom) of camera, and so forth. The software component may be useful at this point in providing a graphical illustration of just how the customer should provide the image. The customer may further be given instructions as to how to activate the image capture device and/or move the image from the device to the general purpose computer.

In one embodiment, it is contemplated that the software component allows for control of the transaction and transaction data throughout the various aspects thereof. For example, the software component may open a folder in a storage location, such as the hard drive of the general-purpose computer, and may work in conjunction with any software that interfaces with the image capture device to deposit the image in such folder. This may advantageously be conducted in a secure manner to prevent any unwanted image diversion or tampering. The hard drive of the general-purpose computer is considered to be a storage location that is controlled by said customer-controlled general purpose computer, but other storage locations such as disk drives, networked drives, and so forth may also be effectively controlled by the general purpose computer.

The software component may itself perform operations such as opening a folder and placing the images therein, or may effectively achieve such operations by instructing the customer and/or other applications to do so. All software operates to some extent under the control and with the support of an operating system running on the general purpose computer, and such support is of course appropriate in embodiments of the invention.

The software component may next cause the image of the check to be presented to the customer for editing, e.g. by asking the customer to crop and/or rotate the check image to a predetermined orientation 206. In embodiments using a scanner, an image of the entire scanner bed, or some otherwise too large image may be generated. If the check was placed in the top left corner of the scanner bed, the customer may be asked to indicate the bottom right corner of the check image, and the image may be cropped to contain only the check image, thereby removing a portion of the originally obtained image.

An appropriately edited image of the check may be placed in the storage location 207. If further images are necessary 208, steps 205-207 may be repeated as necessary. For example, the customer may be instructed to endorse and provide an image of the back side of a check. To ensure the check is appropriately voided, the customer may be asked to write "void" on the check and re-scan the front of the check.

A log file may be generated 209 to collect data for processing or troubleshooting the deposit transaction. The log file is discussed further in connection with FIGS. 4 and 5. The log file may be placed in the storage location along with the various images of the check.

Once the desired images are collected and edited, they may be delivered to the server for processing the deposit 210. The log file may also be delivered at this time. Once such files are delivered, they may be deleted from the customer's general purpose computer. If the server determines that the delivered images and any corresponding data are sufficient to go forward with the deposit, the customer's account may be provisionally credited, and a confirmation page may be delivered to the customer via the customer's browser application 212. The customer may be instructed to destroy, e.g. by shredding, the actual physical check or other negotiable instrument. Under the current check handling procedures in the United States, the physical check is not necessary in processing a deposit, nor is it necessary to keep the original check in bank or customer records.

Figure 3:
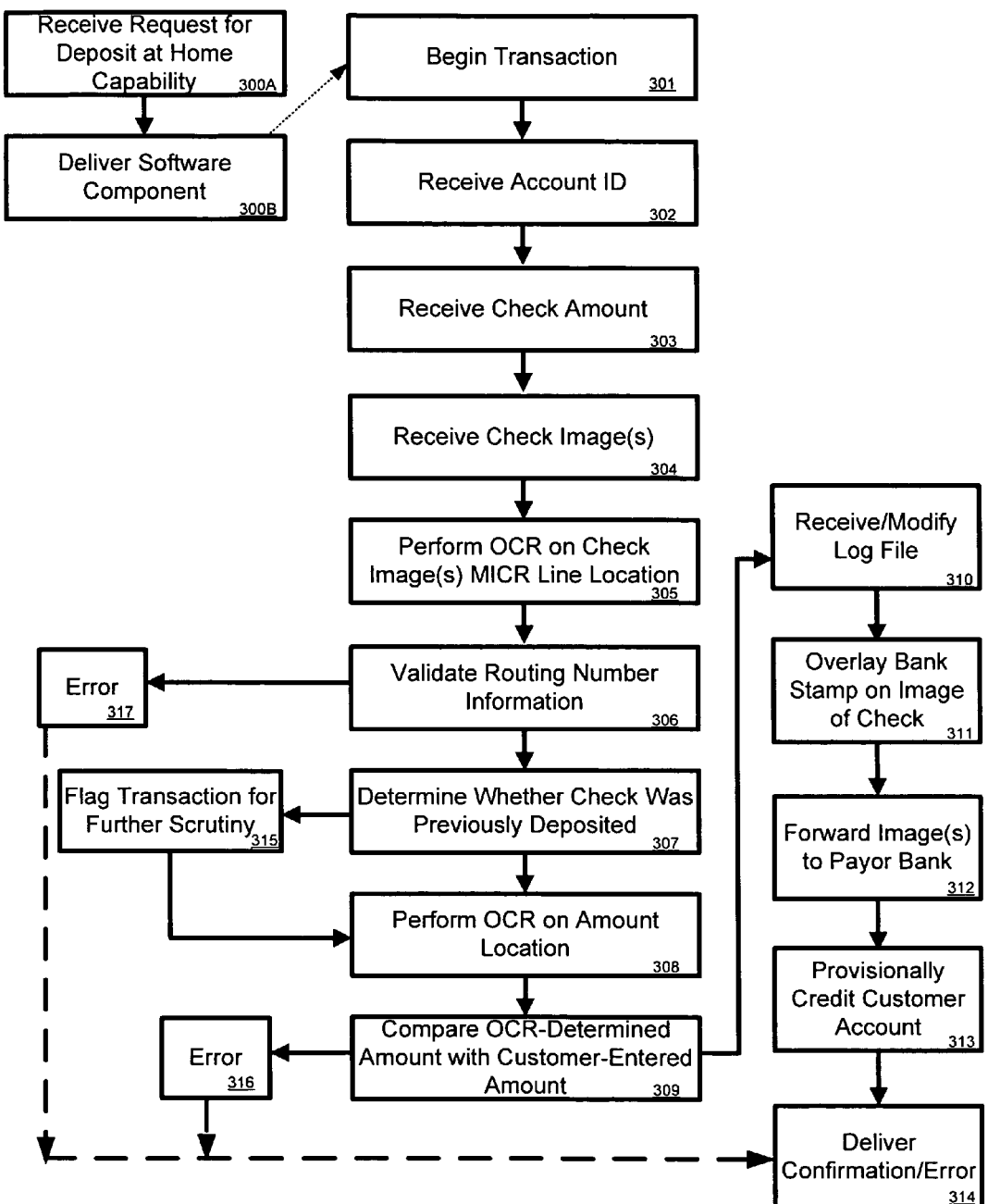
FIG. 3 illustrates a method for processing a check deposit.

FIG. 3 illustrates a method for processing a check deposit. The method of FIG. 3 is designed to complement that of FIG. 2 and to illustrate exemplary steps that may be carried out by a server or other electronics operated by a financial institution before, during, and after the various steps of FIG. 2 are carried out.

In general, as illustrated in FIG. 3, such server may receive a request for deposit at home capability 300A, and in response to such request may deliver a software component to the requesting customer 300B. As with FIG. 2, intermediate steps may comprise determining if the customer is in fact eligible for a remote deposit program, and ensuring the customer has an appropriate virtual machine environment installed on their general purpose computer—in embodiments where the software component requires such an environment.

A transaction may be initiated 301 upon receiving a customer indication that a deposit transaction is desired. The customer is instructed to identify an account per FIG. 2, and as a result the financial institution electronics receive an account identifier (ID) 302. Similarly, financial institution electronics receive check amount 303. At this juncture the software component handles image capture processes, which may or may not involve the server until such time as check image(s) are received 304.

Upon receipt of check images, an Optical Character Recognition (OCR) process may be invoked to determine certain information about the check. For example, OCR may be performed on the check's MICR line location 305 to determine information such as payor bank routing number, account number, and check number. The bank routing number may then be validated 306 against a list of valid routing numbers to ensure that it corresponds to a legitimate bank, and in some embodiments, to ensure it corresponds to a United States bank. In one embodiment, the OCR is conducted in real time, i.e. prior to confirming the deposit transaction for the customer, so as to validate some initial deposit information immediately, and thereby filter transactions that may result in errors were the OCR to be conducted at some later time. In other embodiments, certain efficiencies may be gained by performing "batch" OCR operations at some later time.

In one embodiment, an OCR process can conveniently be applied to an image of a back side of a check in addition to performing OCR on the image of the front side of said check. One problem that may occur involves customer submission of two front images, instead of one front image and one back image. OCR may be performed on a MICR line location of an alleged image of a back side of said check to confirm that said alleged image of a back side of said check does not bear a MICR line. If no MICR line is present in such location then it is more likely that the alleged image of a back side of said check is in fact the back, and not the front, of the check.

Another advantageous use of OCR is on the endorsement location on the back of a check. By performing OCR, it may be possible in some embodiments to determine that the signature matches that of the payor or drafter of the check. However, often signatures are illegible. Thus in one embodiment it is advantageous to determine that some mark or signature is present in the endorsement location on the back of the check, without conducting any further signature identification procedures.

If the routing number determined using OCR cannot be validated, an error may result 317, and the deposit transaction can be aborted. An error message can be delivered to the customer 314, explaining a reason that the transaction could not be processed.

A duplicate checking procedure may be carried out to determine whether the check was previously deposited 307. Determining whether a check is a duplicate can be processor- and memory-intensive, however, so this operation may be initially performed in a manner designed for speed and rough, if not complete, accuracy. More thorough duplicate detection may be performed after the deposit transaction is confirmed 314. For example, in one embodiment, an initial duplicate detection process may proceed as illustrated in FIG. 6.

Figure 6:
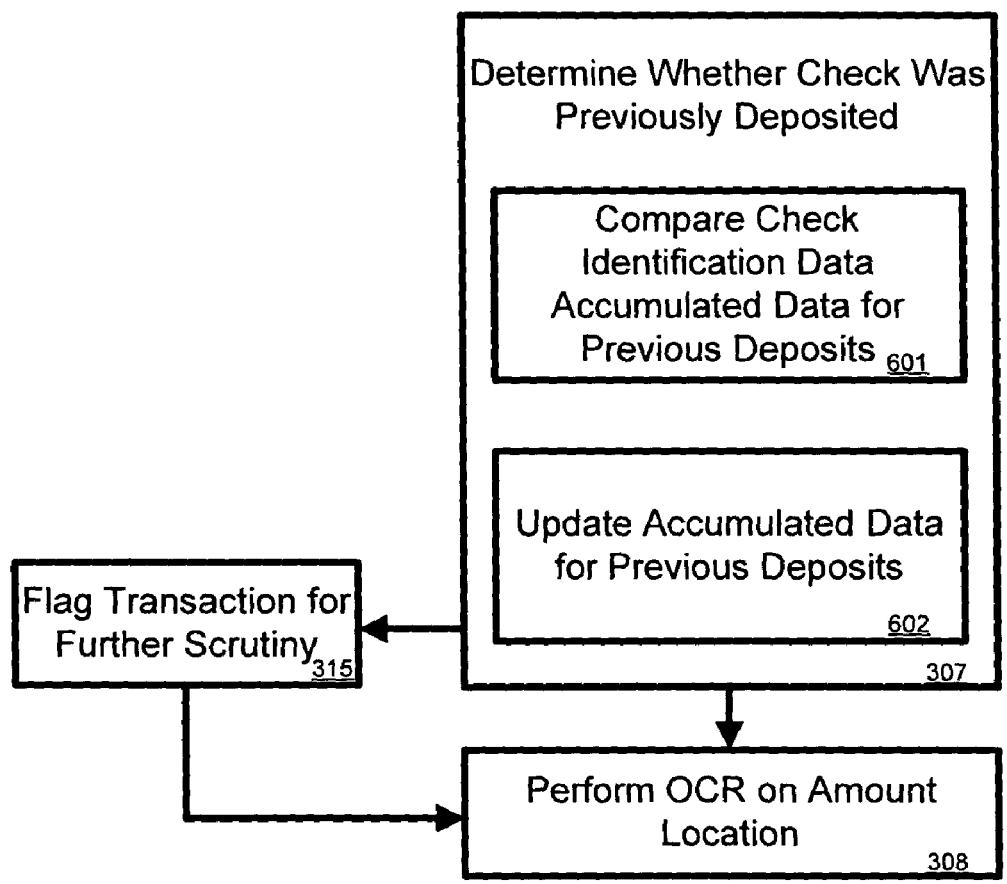
FIG. 6 illustrates an exemplary duplicate checking procedure.

FIG. 6 expands upon step 307 as illustrated in FIG. 3. To undertake at least an initial, provisional duplicate checking procedure, check identification data may be compared against accumulated data for previous check deposits 601. This may entail, for example, comparing check MICR line information against MICR lines for all checks deposited into the transacting customer's account for the previous two weeks. Other embodiments are also possible, for example one might ensure a MICR line does NOT comprise a money amount, because a money amount in a MICR line indicates a check was already deposited. On might scan for a return stamp on the front or back of the check. One might also look for a number 4 in position 44 of the MICR line. Placing a 4 in position 44 is only done when images of checks are made by banks. The fact that an image was made in general implies that the check was already presented to a bank, and therefore it may be advantageous to ensure the check was not presented twice.

According to step 602, if the check deposit proceeds, appropriate check identification data for the deposited check may be added to the accumulated data for previous deposits, so that it too will be available for use in subsequently identifying duplicate deposit attempts.

There are numerous possibilities for false positives in duplicate checking 307. Because of this, it is advantageous in some embodiments to proceed with a deposit transaction despite the fact that a duplicate may be initially identified. As illustrated in FIG. 3, if a duplicate is detected, the transaction may be flagged for further scrutiny 315 at a later time, and the transaction may be allowed to proceed. If a duplicate is not detected, the transaction need not be flagged as abnormal and step 315 is unnecessary.

Returning to FIG. 3, OCR may further be performed on a check amount location 306, and the amount as determined using OCR may be compared against the customer-entered amount received pursuant to step 303. If the amounts do not match, an error 316 can result, terminating the transaction and delivering appropriate information concerning the error to the customer 314. OCR may further be performed on any other aspects of the check image at this time if it is advantageous in specific embodiments to do so.

The server may further receive and modify a deposit transaction log file 310. Alternative versions of the images received may be generated an placed in the log file. Check 21 regulations require a bi-tonal TIFF formatted image, which is generally a low-quality image format as compared to other available image formats. Therefore, it is desirable in some embodiments to retain both a "good" image in an initial format, e.g., in a JPEG format, as well as the modified bi-tonal TIFF required by Check 21. This way, if any troubleshooting is necessary, a good image of the check remains available.

In some embodiments, a bank stamp may be overlaid on the image of the back of the check 311, just as if the check was physically deposited at a bank. Appropriate images may be forwarded to the payor bank for payment 312, and meanwhile, the customer's account may be provisionally credited in the amount of the check 313. A confirmation can be delivered to the customer 314.

At 312, in one embodiment, the bank may forward an image or images to a payor bank. Provisionally crediting the customer account 513 and delivering a confirmation to the customer-controlled general purpose computer 514 may be done before, after, or contemporaneously with step 312. In general, a provisional credit is subject to the check clearing, e.g., by receiving at the payee bank some confirmation that the check will be satisfied from the payor bank. This confirmation from the payor bank can take some time. Provisionally crediting the customers account 513 and sending the confirmation 514 can assure the customer that the transaction will proceed, even though it may not ultimately be successful.

In one embodiment, forwarding an image or images to a payor bank 512 may be performed pursuant to an Automated Clearinghouse (ACH) transaction. ACH transactions typically include payment instructions to debit and/or credit an account. Banks often employ ACH service providers to settle ACH transactions. Examples of ACH service providers include regional branches of the Federal Reserve and the Electronic Payments Network (EPN).

In an ACH transaction, the payee's (customer's) bank may be referred to as the originating depository financial institution (ODFI). Upon receipt of appropriate check information, the payee's bank may credit funds to the payee's account and generate an ACH debit entry to the payor's account, which may be presented to the ACH service provider for processing.

The ACH service provider may process the debit entry by identifying the account and bank from which the check is drawn. The bank from which the check is drawn (i.e., the payor's bank) may be referred to as a receiving depository financial institution (RDFI). If the payor's bank verifies the transaction, the ACH service provider may settle the transaction by debiting the payor's bank and crediting the payee's bank. The payor's bank may then debit the payor's account.

A substitute check is typically a paper reproduction of an original check and may be the legal equivalent of the original check. Substitute checks were authorized under The Check Clearing for the 21st Century Act, commonly known as Check 21. The Act was enacted to facilitate the check clearing process by allowing banks to transmit electronic images of checks (e.g., substitute checks) to other banks rather than physically sending the original paper checks. Check 21 does not require that banks use substitute checks. In fact, many banks may have voluntary agreements to accept certain electronic images of checks even though the images may not qualify as substitute checks under Check 21. If a bank does not have a voluntary agreement and/or refuses to accept an electronic image, the financial institution is required under Check 21 to accept a substitute check in lieu of the original check.

The bank may process the ACH debit entry, substitute check, and/or electronic image. As noted above, the bank may present the ACH debit entry to an ACH service provider (e.g., EPN), which may be responsible for settling the transaction between the payee's bank and the payor's bank. The bank also may convert the digital image into a substitute check and present the substitute check to an intermediary bank (e.g., a regional branch of the Federal Reserve) to complete the check clearing process. If the payor's bank and the payee's bank are the same, the transaction can be handled internally at the payor bank by simply debiting the account of one customer and crediting the account of another. Thus, an intermediate step may comprise identifying if the payor bank and the payee bank are one and the same, or otherwise operating in a closely cooperative manner.

Figure 4:
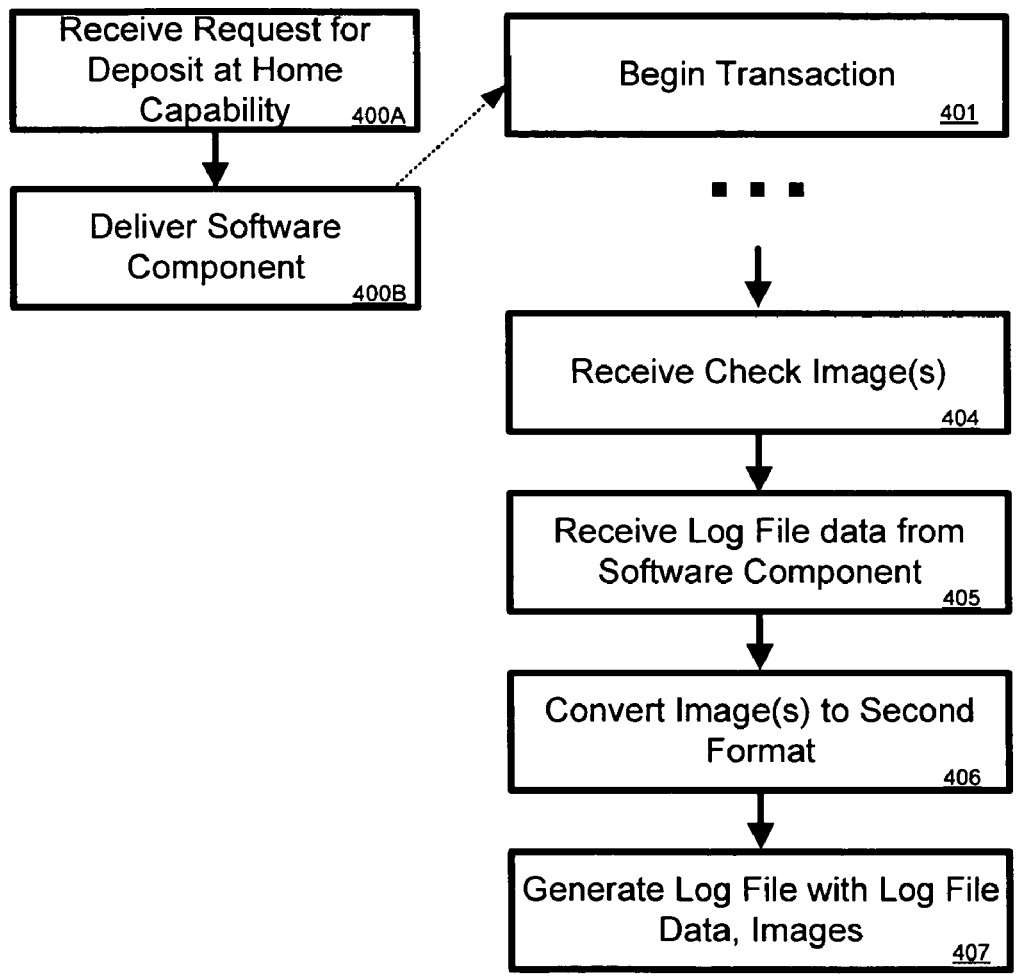
FIG. 4 illustrates a method for processing check deposits, with particular applicability to generation and use of an appropriate log file.
Figure 5:
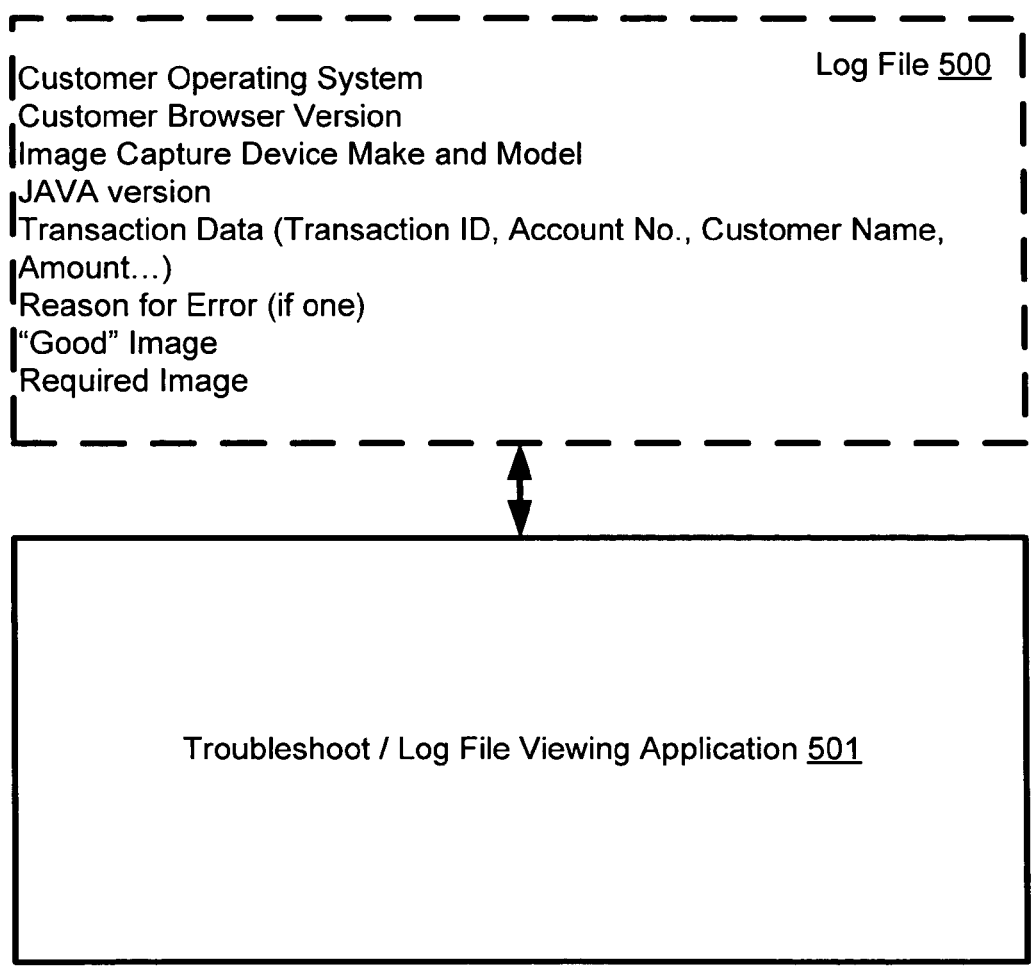
FIG. 5 illustrates an exemplary log file and log file viewing application.

FIGS. 4 and 5 are directed to methods for processing check deposits, with particular applicability to generation and use of an appropriate log file. With reference to FIG. 4, a bank server and/or related electronics can receive a request for "deposit at home" or remote deposit capability 400A, and deliver a software component to a customer's general purpose computer 400B as described above. In general, a transaction may begin 401 and proceed as described with regard to FIGS. 2 and 3. The three dots in FIG. 4 are a general reference to steps of a deposit transaction that may occur. In the course of such transaction, a log file maybe generated, for example by a software component on a customer-controlled general purpose computer. The log file comprises log file data, and may be delivered to the server by the software component. Log file data may comprise, for example the data illustrated in the log file 500 in FIG. 5.

In one embodiment, a financial institution server may receive one or more check images 404, and may receive log file data from the software component 405. Other embodiments are will be readily recognized as possible, such as placing the images in the log file and combining steps 404 and 405, or streaming raw data absent any sort of file structure, and allowing the server to generate a file upon receipt of such data.

Step 406 comprises converting an image from a first format to a second format. In one embodiment, the first format is, for example, a relatively high-quality Joint Photographic Experts Group (JPEG) format, such as might be initially generated by the image capture device used by a customer in producing the check image. Due to its high quality, such an image provides a good tool for subsequently troubleshooting a deposit transaction. For example, it might be readily determined if the image represents a check that was previously deposited by simple human inspection of both images.

The second format is, in one embodiment, a format that complies with bank-to-bank image transfer requirements. Currently, the image format required by Check 21 is the bi-tonal Tag Image File Format (TIFF). Therefore the second format may be, for example, a bi-tonal Tag Image File Format (TIFF).

In a further embodiment, the images in both formats can be retained, for example, in the log file. Each image is useful for its own purpose—the first for troubleshooting, the second for regulatory compliance and business necessity. Thus, step 407 illustrates generating a log file with log file data and images. The term "generating" may be exchanged for "modifying" in some embodiments, e.g. where the log file was received from the software component, and simply modified to further comprise an additional check image that is in a different format. The generating step 407 may be broken into a plurality of steps, each step for generating an aspect of log file 500 in FIG. 5.

Referring now to FIG. 5, an exemplary log file 500 is illustrated and examples of data that may be placed in the log file 500 are listed. In general, a log file can advantageously comprise an identification of an image capture device used to generate an image of a check, for example a scanner make and model, digital camera make and model, or other identification information such as an image capture device Global Unique Identifier (GUID). This identification information may also include an identification of software associated with the device, for example the familiar TWAIN drivers that can be used with scanners, digital cameras, and other image capture devices.

Furthermore, with regard to log file 500, a customer operating system can comprise an identification of the operating system used by the customer's general purpose computer. A customer browser version can comprise the browser used by the customer's general purpose computer. Image capture device make and model may comprise the type of image capture device, manufacturer, and model number. "JAVA version" may comprise a version of the JAVA virtual machine software used by the customer's general purpose computer, or, if .NET technologies are used, the version of the .NET Framework. Transaction data may comprise information such as transaction ID, account number, customer name, amount of deposit, check routing number, check number, check account number, and so forth. Reason for error may be provided if an error occurred—for example, due to an invalid check routing number, different amounts identified by the customer and the OCR process, etc. Finally, the "good" image (customer generated image) and the "required" image (required for bank-to-bank image transfer) may also be included.

The log file 500 may be consumed by a troubleshooting or log file viewing application 501. Such an application may be provided to financial institution employees to view log files and solve problems associated with particular deposits. The application 501 may also collect statistical information and the like regarding all log files.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the disclosed embodiments. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the processing of the disclosed embodiments.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed:

1. A processor-implemented method for processing a check deposit, comprising:
    receiving, at a financial institution, a customer request relating to remote deposit of a check;
    transmitting, in response to the customer request, a deposit processing component from a server to a customer controlled device communicatively coupled to a general purpose image capture device;
    receiving at said financial institution a check image from the deposit processing component running on the customer controlled device, the check image captured by the image capture device, and where said check image comprises an image of a possible back side of said check;
    performing by a processor at the financial institution Optical Character Recognition (OCR) on said check image, wherein said performing OCR comprises performing OCR on a Magnetic Ink Character Recognition (MICR) line location of said image of said possible back side of said check to confirm that said image of said possible back side of said check does not bear a MICR line; and
    obtaining deposit information from said check image based on the OCR.

2. The method of claim 1, wherein said performing OCR comprises performing OCR on said MICR line location of said check image.

3. The method of claim 2, wherein said performing OCR on said MICR line location comprises performing OCR on a routing number.

4. The method of claim 2, wherein said performing OCR on said MICR line location comprises performing OCR on an account number.

5. The method of claim 2, wherein said performing OCR on said MICR line location comprises performing OCR on a check number.

6. The method of claim 1, wherein said performing OCR comprises performing OCR on an amount location of said check image.

7. The method of claim 1, wherein said performing OCR comprises performing OCR on an account holder name.

8. The method of claim 1, wherein said performing OCR comprises performing OCR on an endorsement signature.

9. A system for processing a check deposit, comprising:
    a memory;
    a processor disposed in communication with said memory, and configured to execute a plurality of processing instructions stored in the memory to:
        receive, at a financial institution, a customer request relating to remote deposit of a check;
        transmit, in response to the customer request, a deposit processing component from a server to a customer controlled device communicatively coupled to a general purpose image capture device;
        receive at said financial institution a check image from the deposit processing component running on the customer controlled device, the check image captured by the image capture device, and where said check image comprises an image of a possible back side of said check;
        perform by a processor at the financial institution Optical Character Recognition (OCR) on said check image, wherein said performing OCR comprises performing OCR on a Magnetic Ink Character Recognition (MICR) line location of said image of said possible back side of said check to confirm that said image of said possible back side of said check does not bear a MICR line; and obtain deposit information from said check image based on the OCR.

10. The system of claim 9, wherein the performing OCR comprises performing OCR on said MICR line location of said image.

11. The system of claim 10, wherein the performing OCR on said MICR line location comprises performing OCR on a routing number.

12. The system of claim 10, wherein the performing OCR on said MICR line location comprises performing OCR on an account number.

13. The system of claim 10, wherein the performing OCR on said MICR line location comprises performing OCR on a check number.

14. The system of claim 9, wherein the performing OCR comprises performing OCR on an amount location of said check image.

15. The system of claim 9, wherein the performing OCR comprises performing OCR on an account holder name.

16. The system of claim 9, wherein the performing OCR comprises performing OCR on an endorsement signature.

17. A computer readable medium storing computer-executable instructions executed by a processor to:

receive, at a financial institution, a customer request relating to remote deposit of a check:

transmit, in response to the customer request, a deposit processing component from a server to a customer controlled device communicatively coupled to a general purpose image capture device;

receive at said financial institution a check image from the deposit processing component running on the customer controlled device, the check image captured by the image capture device, and where said check image comprises an image of a possible back side of said check;

perform by a processor at the financial institution Optical Character Recognition (OCR) on said check image, wherein said performing OCR comprises performing OCR on a Magnetic Ink Character Recognition (MICR) line location of said image of said possible back side of said check to confirm that said image of said possible back side of said check does not bear a MICR line; and obtain deposit information from said check image based on the OCR.

18. The computer readable medium of claim 17, wherein said instructions for performing OCR comprises instructions for performing OCR on said MICR line location of said check image.

19. The computer readable medium of claim 18, wherein the instructions for performing OCR on said MICR line location further comprises instructions for performing OCR on a routing number.

20. The computer readable medium of claim 18, wherein the instructions for performing OCR on said MICR line location further comprises instructions for performing OCR on an account number.

21. The computer readable medium of claim 18, wherein the instructions for performing OCR on said MICR line location further comprises instructions for performing OCR on a check number.

22. The computer readable medium of claim 17, wherein the instructions for performing OCR further comprises instructions for performing OCR on an amount location of said check image.

23. The computer readable medium of claim 17, wherein the instructions for performing OCR further comprises instructions for performing OCR on an account holder name.

24. The computer readable medium of claim 17, wherein the instructions for performing OCR further comprises instructions for performing OCR on an endorsement signature.

* * * * *